US008396605B2

(12) United States Patent
Ogawa et al.

(10) Patent No.: US 8,396,605 B2
(45) Date of Patent: Mar. 12, 2013

(54) SYSTEM FOR SIMULATING HEAT AND POWER SUPPLY FACILITY

(75) Inventors: Teruhiko Ogawa, Hyogo (JP); Satoshi Shimizu, Hyogo (JP); Toshiko Kurata, Hyogo (JP)

(73) Assignee: E. I. Engineering Co., Ltd., Hyogo (JP)

( * ) Notice: Subject to any disclaimer, the term of this patent is extended or adjusted under 35 U.S.C. 154(b) by 224 days.

(21) Appl. No.: 12/736,549

(22) PCT Filed: Apr. 17, 2009

(86) PCT No.: PCT/JP2009/057802
§ 371 (c)(1),
(2), (4) Date: Oct. 18, 2010

(87) PCT Pub. No.: WO2009/128548
PCT Pub. Date: Oct. 22, 2009

(65) Prior Publication Data
US 2011/0035069 A1   Feb. 10, 2011

(30) Foreign Application Priority Data

Apr. 17, 2008  (JP) .................................. 2008-107485
Sep. 26, 2008  (JP) .................................. 2008-248339

(51) Int. Cl.
*G06F 1/26* (2006.01)
(52) U.S. Cl. ........................ 700/288; 700/287; 700/300
(58) Field of Classification Search ................. 700/275, 700/276, 278, 286, 287, 288, 295, 299, 300; 703/6, 7, 13
See application file for complete search history.

(56) References Cited

U.S. PATENT DOCUMENTS

| 6,968,295 | B1 * | 11/2005 | Carr ............................... 700/286 |
| 7,489,990 | B2 * | 2/2009 | Fehr et al. ..................... 700/286 |
| 7,890,215 | B2 * | 2/2011 | Duncan ......................... 700/276 |
| 2008/0161975 | A1 * | 7/2008 | Stanimirovic ................. 700/276 |
| 2008/0161976 | A1 * | 7/2008 | Stanimirovic ................. 700/276 |
| 2009/0171512 | A1 * | 7/2009 | Duncan ......................... 700/300 |

FOREIGN PATENT DOCUMENTS

| JP | 07-007554 A | 1/1995 |
| JP | 08-200155 A | 8/1996 |
| JP | 09-191503 A | 7/1997 |
| JP | 11-039004 A | 2/1999 |
| JP | 2001-100601 A | 4/2001 |
| JP | 2002-227721 A | 8/2002 |
| JP | 2002-295308 A | 10/2002 |
| JP | 2003-67456 A | 3/2003 |
| JP | 2003-143757 A | 5/2003 |

(Continued)

OTHER PUBLICATIONS

International Search Report mailed on Jul. 21, 2009.

(Continued)

*Primary Examiner* — Charles Kasenge
(74) *Attorney, Agent, or Firm* — Rader, Fishman & Grauer PLLC

(57) ABSTRACT

A system, for simulating a heat and power supply facility, that is capable of easily constructing a heat and power supply facility, and that performs a simulation so as to approximate operating conditions including a load factor to an actual situation, by approximating, to a high accuracy, any item included in a total combined energy to a target value.

23 Claims, 20 Drawing Sheets

| | FOREIGN PATENT DOCUMENTS | | |
|---|---|---|---|
| JP | 2004-173342 A | 6/2004 |
| JP | 2004-318824 A | 11/2004 |
| JP | 2005-325765 A | 11/2005 |
| JP | 2006-226572 A | 8/2006 |
| JP | 2006-299996 A | 11/2006 |
| JP | 2007-270659 A | 10/2007 |

OTHER PUBLICATIONS

Japan Office Action 6 pages mailed on Jun. 1, 2010.

* cited by examiner

Fig4

|  | OUTDOOR AIR TEMPERATURE [°C] | WET-BULB TEMPERATURE [°C] | CHILLED WATER LOAD A [MJ] | ELECTRIC POWER LOAD [kW] | CHILLED WATER SUPPLY [°C] | CHILLED WATER RETURN [°C] |
|---|---|---|---|---|---|---|
| 0 - 1 | 24.1 | 20.4 | 1723.6 | 181.9 | 7.0 | 9.1 |
| 1 - 2 | 24.1 | 20.3 | 1639.8 | 172.8 | 7.0 | 9.0 |
| 2 - 3 | 24.2 | 20.2 | 1591.9 | 170.3 | 7.0 | 9.0 |
| 3 - 4 | 24.3 | 20.2 | 1544.0 | 168.8 | 7.0 | 8.9 |
| 4 - 5 | 24.2 | 20.4 | 1783.4 | 166.5 | 7.0 | 9.2 |
| 5 - 6 | 24.4 | 20.7 | 1723.6 | 169.4 | 7.0 | 9.6 |
| 6 - 7 | 25.1 | 21.2 | 6080.4 | 186.2 | 7.0 | 10.1 |
| 7 - 8 | 26.1 | 21.5 | 6403.6 | 336.3 | 7.0 | 11.2 |
| 8 - 9 | 27.1 | 21.6 | 7756.1 | 468.6 | 7.0 | 11.6 |
| 9 - 10 | 28.8 | 22.6 | 8067.3 | 616.3 | 7.0 | 12.0 |
| 10 - 11 | 29.9 | 23.0 | 8306.7 | 817.1 | 7.0 | 12.0 |
| 11 - 12 | 30.7 | 22.7 | 8462.3 | 910.2 | 7.0 | 12.0 |
| 12 - 13 | 31.2 | 23.1 | 8641.8 | 911.8 | 7.0 | 12.0 |
| 13 - 14 | 31.6 | 22.9 | 8761.5 | 917.9 | 7.0 | 12.0 |
| 14 - 15 | 31.4 | 23.1 | 8844.7 | 899.4 | 7.0 | 12.0 |
| 15 - 16 | 31.3 | 23.0 | 8881.2 | 883.0 | 7.0 | 11.9 |
| 16 - 17 | 30.8 | 23.0 | 8797.4 | 893.5 | 7.0 | 11.9 |
| 17 - 18 | 29.4 | 22.4 | 7824.6 | 898.8 | 7.0 | 11.7 |
| 18 - 19 | 28.1 | 21.6 | 4636.9 | 897.0 | 7.0 | 11.6 |
| 19 - 20 | 27.5 | 21.4 | 3507.0 | 861.4 | 7.0 | 11.1 |
| 20 - 21 | 27.1 | 21.3 | 3147.9 | 703.6 | 7.0 | 10.5 |
| 21 - 22 | 26.6 | 21.2 | 3004.3 | 581.8 | 7.0 | 9.9 |
| 22 - 23 | 26.3 | 21.4 | 2046.8 | 400.0 | 7.0 | 8.9 |
| 23 - 24 | 25.9 | 21.4 | 1771.5 | 246.8 | 7.0 | 8.3 |
| TOTAL | ------ | ------ | 124948.3 | 13459.4 | ------ | ------ |
| MAXIMUM | 31.6 | 23.1 | 8881.2 | 917.9 | 7.0 | 12.0 |

Fig7

DAYTIME 1: SPECIFYING OPERATING PRIORITY

TIME SLOT: [ 8:00 ] HRS. - [ 18:00 ] HRS.  OPERATING MODE OF ELECTRIC POWER GENERATION GROUP DEVICE: PREFERENTIAL OPERATION OF ELECTRIC POWER LOAD

LOAD-SHARING METHOD OF ELECTRIC POWER GENERATION GROUP DEVICE: ONLY LAST DEVICE AT PARTIAL LOAD

| | | 1 | 2 | 3 | 4 | 5 | 6 |
|---|---|---|---|---|---|---|---|
| HIGH-PRESSURE BOILER | | | | | | | |
| LOW-PRESSURE BOILER | LOW-PRESSURE BOILER 1 | | | | | | |
| ELECTRIC POWER GENERATION GROUP DEVICE | GAS TURBINE 1 | | | | | | |

DAYTIME 2: SPECIFYING OPERATING PRIORITY

TIME SLOT: [ 18:00 ] HRS. - [ 22:00 ] HRS.  OPERATING MODE OF ELECTRIC POWER GENERATION GROUP DEVICE: PREFERENTIAL OPERATION OF HEAT LOAD

LOAD-SHARING METHOD OF ELECTRIC POWER GENERATION GROUP DEVICE: ONLY LAST DEVICE AT PARTIAL LOAD

| | | 1 | 2 | 3 | 4 | 5 | 6 |
|---|---|---|---|---|---|---|---|
| HIGH-PRESSURE BOILER | | | | | | | |
| LOW-PRESSURE BOILER | LOW-PRESSURE BOILER 1 | | | | | | |
| ELECTRIC POWER GENERATION GROUP DEVICE | GAS TURBINE 1 | | | | | | |

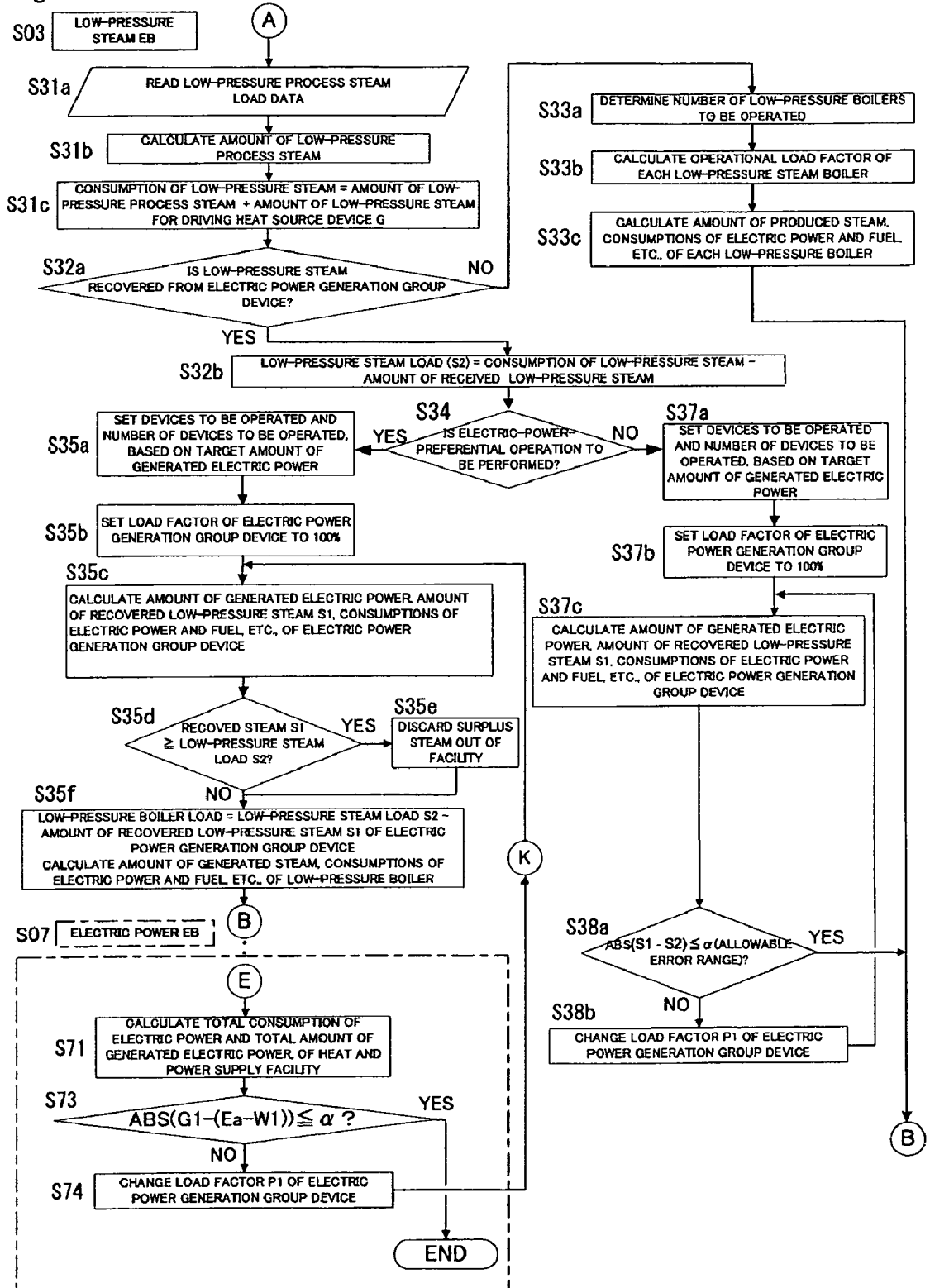

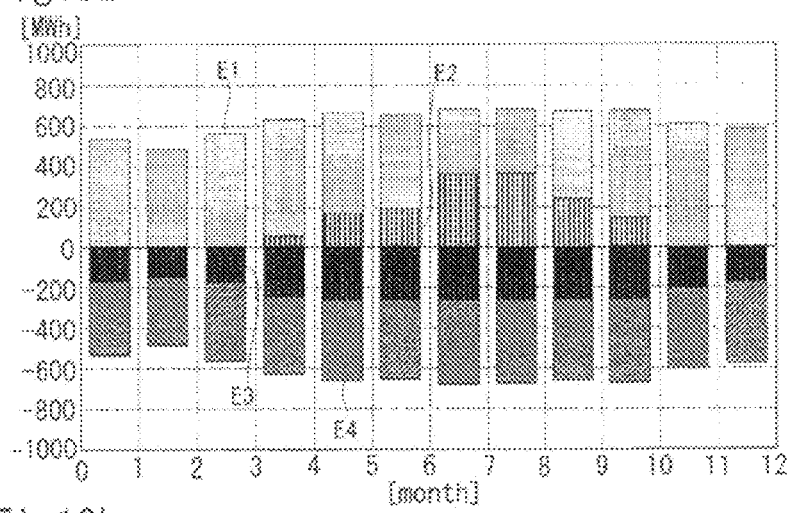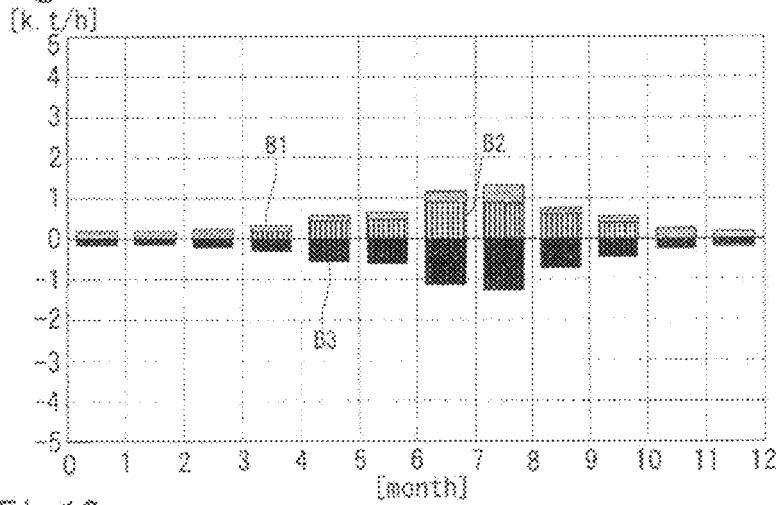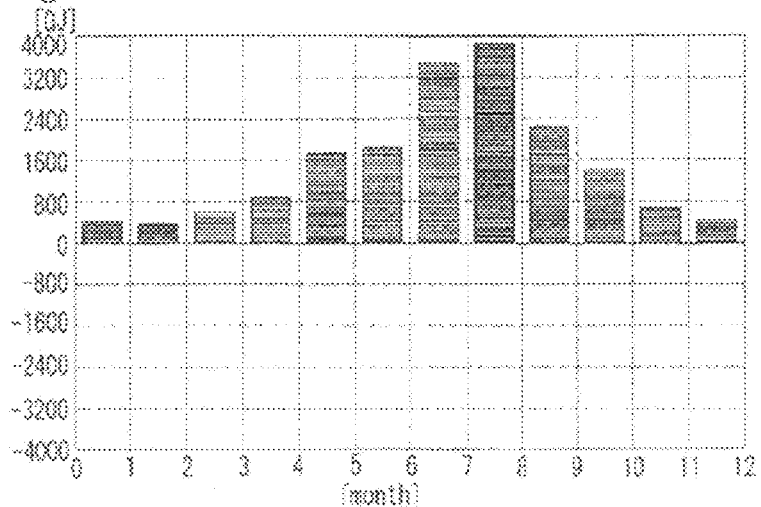

|   |    | M320 | M310 | M310' | M300 |
|---|----|------|------|-------|------|
| (i) | Ma | A1 | A2 |  | C |
|     | Lp | a1 | a2 |  |  |
| (ii) | Ma | A1' | A2' |  | C |
|      |    | A1'=A1−x | A2'=A2+x |  | ±0 |
|      | Lp | a1' | a2' |  |  |
| (iii) | Ma | A1'' | A2'' | D1 | C |
|       |    | A1''=A1−y | A2''=A2+z |  | ±0 |
|       |    | y=z+D1 |  |  |  |
|       | Lp | a1'' | a2'' | d1 |  |

SYSTEM FOR SIMULATING HEAT AND POWER SUPPLY FACILITY

TECHNICAL FIELD

The present invention relates to a system for simulating a heat and power supply facility, and particularly to a system for simulating a heat and power supply facility that has a plurality of heat and power supply devices connected to each other, that is supplied with at least electric power and fuel (hereinafter referred to as a "supplied energy"), that produces at least two items (hereinafter referred to as a "total combined energy") selected from at least electric power, lower-temperature chilled water, chilled water, hot water, hot water for supply, high-pressure steam, and low-pressure steam, and that supplies a utilization facility with the total combined energy, and for obtaining relationships between operating conditions of the heat and power supply devices and an amount used of the supplied energy and/or an amount produced of the total combined energy.

BACKGROUND ART

In the simulation system as described above, any item included in the total combined energy is preferably approximated to a target value to a high accuracy. The reason is that if any item can be approximated to the target value, it is possible to accurately assess an operation, and it becomes easy to execute a plan for energy conservation and the reduction of an environmental load. Well-known techniques related to such a system are those disclosed in the Patent Literature 1 through 7 listed below, for example.

A system for simulating an air conditioner disclosed in Patent Literature 1 constructs a model by individually combining dummy elements that represent heat and power supply devices. The dummy elements are individually combined by causing the corresponding dummy elements included in a second cell group to refer to each other. Thus, to construct a model, expertise is required to at least determine the combination relationships between, and the combination order of, the heat and power supply devices, and it is impossible to easily start a simulation. Further, external conditions such as "an outdoor air wet-bulb temperature, the amount of air flow, and a coil inlet/outlet air temperature" are provided so as to make convergent calculations for a variation caused in the input/output relationships between the dummy elements in a function in the constructed model. Thus it is not at all taken into account that operating conditions are obtained in accordance with a target value of a heat load that is actually required.

A system for optimizing heat and power supply disclosed in Patent Literature 2 sets an objective function, and makes optimization with the provision of a facility constraint and a supply-demand balance constraint, so as to obtain an optimal scale, an optimal operation pattern, a shadow price, and an energy unit price, of a device. Thus it is impossible for a user to manually and freely set the configuration of a device and an operating state. This is also true of: Patent Literature 3 and 4, which use a genetic algorithm; Patent Literature 5, which relates to the minimization of the costs of cogeneration; Patent Literature 6, which relates to the determination of whether an electric-power-preferential operation or a heat-load-preferential operation is to be performed; and Patent Literature 7, which relates to selection from an existing energy generation facility.

In addition, in the system of each of the Patent Literature, the definitions of heat and power supply devices are individually set, and these definitions are highly complex. Further, a nonlinear relationship exists between at least two types of energies that correspond to items of the total combined energy, and therefore programming for obtaining operating conditions that satisfy all the complex definitions of the relationships between a plurality of the devices is more complex and unrealistic. To solve these problems, some of the Patent Literature use a genetic algorithm (Patent Literature 3 and 4), and the phased setting of a load factor, such as 25%, 50%, and 75% (Patent Literature 5). Consequently, it is impossible to set operating conditions in accordance with an arbitrary load factor, and it is impossible to obtain operating conditions in accordance with an actual situation.

Citation List

[Patent Literature]

[PTL 1] Japanese Laid-Open Patent Publication No. 2006-226572

[PTL 2] Japanese Laid-Open Patent Publication No. 2002-227721

[PTL 3] Japanese Laid-Open Patent Publication No. 2004-318824

[PTL 4] Japanese Laid-Open Patent Publication No. 11-39004

[PTL 5] Japanese Laid-Open Patent Publication No. 8-200155

[PTL 6] Japanese Laid-Open Patent Publication No. 2002-295308

[PTL 7] Japanese Laid-Open Patent Publication No. 2003-67456

SUMMARY OF INVENTION

Technical Problem

In view of the conventional circumstances described above, an object of the present invention is to provide a system, for simulating a heat and power supply facility, that is capable of easily constructing a heat and power supply facility, and that performs a simulation so as to approximate operating conditions including a load factor to an actual situation, by approximating, to a high accuracy, any item included in a total combined energy to a target value.

Solution to Problem

To achieve the above object, a system for simulating a heat and power supply facility according to the present invention is a system for simulating a heat and power supply facility that has a plurality of heat and power supply devices connected to each other, that is supplied with at least electric power and fuel (supplied energy), that produces at least two items (total combined energy) selected from at least electric power, lower-temperature chilled water, chilled water, hot water, hot water for supply, high-pressure steam, and low-pressure steam, and that supplies a utilization facility with the total combined energy, and for obtaining relationships between operating conditions of the heat and power supply devices and an amount used of the supplied energy and/or an amount produced of the total combined energy, the system including: an energy load setting section that sets an amount of the total combined energy that is required per day in the utilization facility per time slot; a system configuration setting section that associates in advance the heat and power supply devices with each other and associates in advance the heat and power supply devices with the total combined energy, and selects any of the heat and power supply devices with an operation of an operating condition section, to thereby freely construct a system configuration of the heat and power supply facility in which the heat and power supply devices are associated with each other and the heat and power supply devices are associated with the total combined energy, the heat and power supply devices including at least one heat and power supply device having at least a motor pump; a process condition setting section that sets process conditions of the heat and power supply facility and the utilization facility, the process conditions including at least one of an outdoor air temperature and a wet-bulb temperature; an operating condition setting section that sets whether or not each of the heat and power supply devices is to be operated per time slot, and that sets an operating priority of each of the heat and power supply devices per time slot; and a calculation section that at least calculates an amount produced of the total combined energy to be obtained when the heat and power supply facility is operated in accordance with the operating conditions set by the operating condition setting section, and any of the heat and power supply devices have a partial load characteristic that varies in accordance with the process conditions; and the calculation section makes convergence calculations so as to change by changing a load factor of the heat and power supply devices corresponding to any item included in the total combined energy so that an amount produced of the item converges on a target value set by the energy load setting section, adjust, based on the changed load factor, a balance of the combined total energy associated with at least the corresponding heat and power supply devices, and repeatedly change the load factor of the corresponding heat and power supply devices and adjust the balance until the amount produced converges on the target value.

With the above configuration, the system configuration setting section associates in advance the heat and power supply devices with each other and the heat and power supply devices with the total combined energy, and therefore even a nonexpert can freely construct the system configuration of the heat and power supply facility. Further, the system configuration setting section selects any of the heat and power supply devices based on an operation on the operating condition section, to thereby associate the heat and power supply devices with each other and the heat and power supply devices with the total combined energy, the heat and power supply devices including at least one heat and power supply device having at least a motor pump. Then convergence calculations are made by changing a load factor so as to repeatedly change a load factor of the heat and power supply devices corresponding to any item included in the combined total energy an adjust a balance of the combined total energy, until an amount produced of the item converges on a target value set by the energy load setting section. For example, when in the heat and power supply facility including a gas turbine cogeneration system, a load factor is changed so as to be approximated to a target electric power to be supplied, so that electric power does not flow back, the consumptions of internal electric power of the devices included in the heat and power supply facility vary in accordance with the variation of the amount of low-pressure steam, and therefore a target amount of generated electric power, per se, varies. Thus the conventional systems described above cannot achieve convergence. In the present invention, however, "the heat and power supply devices are associated with each other and the heat and power supply devices are associated with the total combined energy", and therefore it is possible to balance an electric power energy so that the electric power to be supplied to the outside, having had subtracted therefrom the consumptions of internal electric power, converges on a target value (including 0 in the case of internal consumption only). In this example, convergence calculations are made so as to solve the problems caused by the interaction between low-pressure steam and electric power. It is, however, also possible to similarly solve the problems caused by the interaction between other two types of energies.

The total combined energy may be calculated such that a steam energy is calculated before an electric power energy is, and another energy is calculated before the steam energy is. The reason is that for example, chilled water and hot water can be produced from steam energy, and steam energy can be generated during the production process of electric power energy, and therefore it is possible to rationally make convergence calculations, decreasing energy loss. In addition, the convergence calculations are preferably convergent calculations made based on a numerical solution of algebraic equations.

The heat and power supply devices are each classified by group including at least an electric power generation group, a boiler group, a chilled water group, a hot water group, a lower-temperature chilled water group, and a hot water supply group, so as to share a load determined based on a balance between the groups when any of the heat and power supply devices is selected. This makes it possible to rationally construct the system.

The system configuration setting section is capable of arbitrarily setting, among the heat and power supply devices, a plurality of heat and power supply devices that are of the same type, that differ in capacity, that differ in energy source for operation, or that differ in manufacturer, so as to cause each of the heat and power supply devices to operate in accordance with the operating conditions set by the operating condition setting section. This makes it possible to rationally select each device and set the operation of the device.

Further, the heat and power supply facility may include an electric power generation group device having an exhaust heat recovery boiler; and when the electric power generation group device is operated under a preferential operation of heat load, an electric power generation load factor of the electric power generation group device (an amount of generated electric power of the electric power generation group) per time slot may be set by making convergence calculations so that an amount of steam generated by the exhaust heat recovery boiler of the electric power generation group device does not exceed a steam load required in the heat and power supply facility and/or the utilization facility.

The heat and power supply facility may include an electric power generation group device having an exhaust heat recovery boiler; and when the electric power generation group device is operated under a preferential operation of electric power load, an electric power generation load factor of the electric power generation group device (an amount of generated electric power of the electric power generation group) per time slot may be set by making convergence calculations so that an electrical energy from an electric power generator of the electric power generation group device does not flow back as surplus electricity to an electric power company.

The heat and power supply facility may include a steam generator having a gas engine, a waste-hot-water-driven absorption chiller, and an other chilled water group device; an amount of heat of chilled water to be produced by the waste-hot-water-driven absorption chiller may be calculated based on the number and a load factor of the waste-hot-water-driven absorption chillers to be operated that are set based on the operating conditions; an amount of heat of chilled water of the waste-hot-water-driven absorption chiller that can be generated by an amount of heat of waste hot water recovered from the gas engine may be calculated; and the number and/or a load factor of all the chilled water group devices to be operated per time slot may be set by, when the amount of heat of chilled water to be generated is insufficient as compared to the amount of heat of chilled water to be produced, changing the number and/or a load factor of the other chilled water group devices to be operated in accordance with the operating conditions so that the other chilled water group devices compensate for the insufficient amount of heat of chilled water, and making convergence calculations by changing a load factor of the steam generator so that an amount of steam of the steam generator to be generated converges on an amount of steam of the other chilled water group devices that is required based on the changed number and/or the changed load factor of the other chilled water group devices to be operated.

The heat and power supply facility may include a steam generator having a gas engine, a hot water recovery heat exchanger, and an other hot water group device; an amount of heat of hot water to be produced by the hot water recovery heat exchanger is calculated based on the number and a load factor of the hot water recovery heat exchangers to be operated that are set based on the operating conditions; an amount of heat of hot water of the hot water recovery heat exchanger that can be generated by an amount of heat of waste hot water recovered from the gas engine may be calculated; and the number and/or a load factor of all the hot water group devices to be operated per time slot may be set by, when the amount of heat of hot water to be generated is insufficient as compared to the amount of heat of hot water to be produced, changing the number and/or a load factor of the other hot water group devices to be operated in accordance with the operating conditions so that the other hot water group devices compensate for the insufficient amount of heat of hot water, and making convergence calculations by changing a load factor of the steam generator so that an amount of steam of the steam generator to be generated converges on an amount of steam of the other hot water group devices that is required based on the changed number and/or the changed load factor of the other hot water group devices to be operated.

The system may further include a lower-temperature chilled water group device, a chilled water group device, a hot water group device, a hot water supply group device, a steam generator, and an electric power generation group device, and the operating condition setting section with respect to electric power and a boiler may include a specifying section for controlling a minimum purchase amount of electric power; and the number and/or a load factor of the electric power generation group devices to be operated per time slot may be set by making convergence calculations so that electric power purchased from an electric power company is a minimum purchase amount of electric power specified by the specifying section.

The heat and power supply devices may include a plurality of heat source devices corresponding to any load of the total combined energy; a load factor of each of the heat source devices may be calculated again by calculating an overall heat balance by changing an outlet temperature of a device, among the heat source devices, whose load factor exceeds 100%; and the outlet temperature may be repeatedly changed until the load factors of all the heat source devices are equal to or less than 100%. In this case, the outlet temperature of the device, among the heat source devices, whose load factor exceeds 100% may be set to a temperature where the load factor is 100%.

With the above configuration, it is possible to solve the problems caused by the setting of the outlet temperature. Particularly, when the outlet temperature is set as a precondition for the convergence calculations described above, it is possible to set the heat and power supply facility to conditions where the heat and power supply facility can be operated in accordance with an actual situation to an increased degree.

Further, conditions and parameters that are set in the respective setting sections can preferably be stored as a case file in an electronic storage medium.

The supplied energy may further include at least any of lower-temperature chilled water, chilled water, hot water, hot water for supply, high-pressure steam, and low-pressure steam.

The system may further include: an air-cooled heat pump that generates warm heat by collecting heat from the air; and/or an electric heat pump system that generates warm heat by collecting heat from external use water, and the heat and power supply facility may exhaust heat to external use water.

In addition, the present invention can be carried out as a computer program to be read by a computer to be thereby executed by each mechanism described above, and also as a storage medium having stored therein the computer program.

Further, the system may further include a display control section that displays and controls the heat and power supply facility as a flow diagram in which the plurality of heat and power supply devices, the supplied energy, and the total combined energy are connected to each other by connecting lines so as to be associated with each other in advance, and when any of the heat and power supply devices are selected in the flow diagram, the system configuration of the heat and power supply facility based on the associations with the selected heat and power supply devices may be constructed, and the selected heat and power supply devices, the connecting lines, and the total combined energy and the supplied energy that are associated with the selected heat and power supply devices may be distinguishably displayed.

In this case, device data of the selected heat and power supply devices may be set using a device template file read from a DB server or a device template file modified by a user. Note that it is also possible to set a heat and power supply device whose device data is not input.

When a setting of device data of a heat and power supply device, among the distinguishably displayed heat and power supply devices, has completed, display may be made to further distinguishably indicate that change of the setting is completed.

Further, it is preferable that the system further includes a calculation determination section that determines whether or not the convergence calculations made by the calculation section are completed, and the heat and power supply devices include heat source devices; and when the calculation determination section has determined that the convergence calculations are not completed because capacities of devices selected by the operating condition setting section are insufficient, the calculation determination section increases the number of heat source devices, among the heat source devices, that have lowest operating priorities set by the operating condition setting section, so that the calculations are completed, and the calculation section makes convergence calculations again based on the changed number of the heat source devices. When a large number of heat source devices are set, the calculation section makes calculations based on a necessary number of heat source devices in accordance with the operating priorities. Furthermore, when having increased the number of the heat source devices, the calculation determination section may display the operating conditions of the added heat source devices at least with types of classification of the added heat source devices.

The system may further include a setting section capable of making an energy assessment of an electric power load set by the energy load setting section in the heat and power supply facility, by switching for selection between whether the electric power load is used only in the utilization facility or is used in both the utilization facility and the heat and power supply facility. In addition, the system may further include a setting section capable of making an energy assessment of a steam load by switching for selection between whether the steam load is used only in the utilization facility or is used in both the utilization facility and the heat and power supply facility.

When the heat and power supply devices are specified with a time on the operating conditions and displayed and any of the heat and power supply devices, the supplied energy, and the total combined energy are selected, a calculation result of the calculation section at the specified time on the operating conditions is displayed.

Advantageous Effects of Invention

With the features of the system for simulating a heat and power supply facility according to the present invention, it is possible to easily construct a heat and power supply facility, and perform a simulation so as to approximate operating conditions including a load factor to an actual situation, by approximating, to a high accuracy, any item included in a total combined energy to a target value.

That is, it is possible to reproduce operating conditions, such as the number and the load factor of component devices to be operated, so as to match an actual condition. This makes it also possible to reproduce the consumption of a supplied energy to an improved accuracy, and therefore possible to assess energy conservation, and assess and reduce an environmental load, easily and quickly. Further, this makes it also possible to rationally select a device having a small environmental load.

In addition, electric power costs and the device performances of the heat and power supply devices set by the system configuration setting section are input from a database, and therefore even a nonexpert can easily perform these settings. Then conditions and parameters that are set in the respective setting sections are stored and saved as a case file in an electronic storage medium, and shared on a network and the like. This enables a user to rationally consult about energy conservation.

Other objects, configurations, and effects of the present invention will become apparent from the following description of embodiments of the present invention.

BRIEF DESCRIPTION OF DRAWINGS

FIG. 4 is a diagram showing an example of heat and power load data.

FIG. 7 is a diagram showing the settings of the operating conditions of an electric power generation group device and a boiler group device in daytime.

FIG. 8c is a general logic flow diagram of low-pressure steam energy balancing.

FIG. 9b is a graph showing an example of a low-pressure steam balance in the same conditions as those of FIG. 9a.

FIG. 9c is a diagram showing a result of convergence calculations where neither back-flow electric power nor surplus steam are to be generated, the diagram corresponding to FIG. 9a.

FIG. 10a is an example of a graph of an annual electric power balance.

FIG. 10b is an example of a graph of an annual low-pressure steam balance.

FIG. 10c is an example of a graph of an annual chilled water balance.

DESCRIPTION OF EMBODIMENTS

An embodiment of the present invention is described with reference to FIGS. 1 through 14.

Figure 1A:
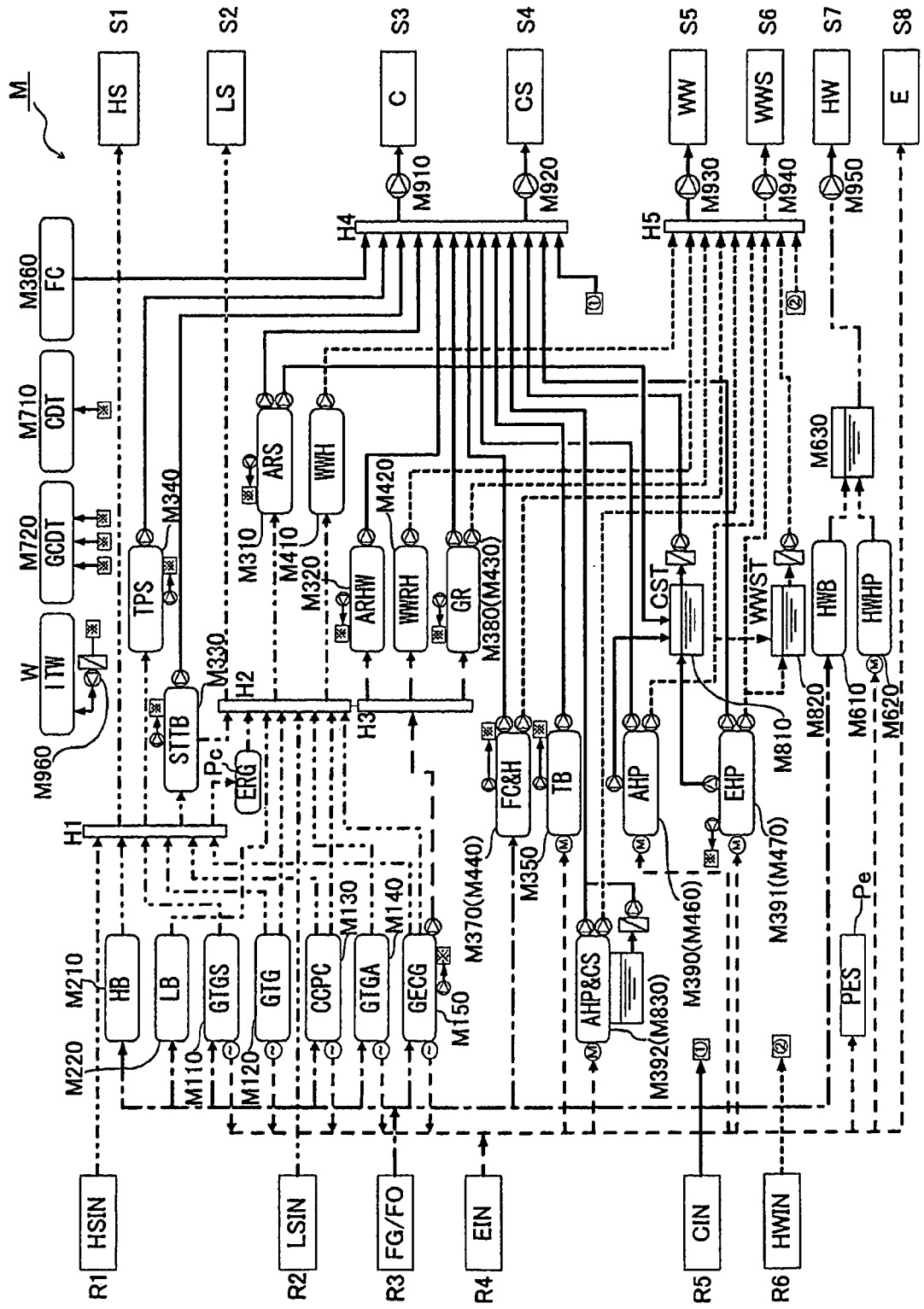
FIG. 1a is a general system diagram of a heat and power supply facility to be the object of a simulation system according to the present invention.

FIG. 1a exemplifies a general system diagram of a heat and power supply facility according to the present invention. A heat and power supply facility M includes a plurality of heat and power supply devices. As shown in Table 1a, the heat and power supply facility M exemplified in FIG. 1a is supplied with steam R (high-pressure steam R1 and low-pressure steam R2), fossil fuel and other fuel (hereinafter referred to simply as "fuel") R3, electric power R4, chilled water R5, and hot water R6, and produces steam S (high-pressure steam S1 and low-pressure steam S2), chilled water S3, chilled water S4, hot water S5, hot water S6, hot water for supply S7, and electric power S8 to supply a utilization facility (a building, a factory, district heating and cooling, or the like) with the produced items.

TABLE 1a

| SIGN | ABBR. | NAME |
|---|---|---|
| R | R | STEAM RECEIVING |
| R1 | HSIN | HIGH-PRESSURE STEAM RECEIVING |
| R2 | LSIN | LOW-PRESSURE STEAM RECEIVING |
| R3 | FG/FO | FUEL (GAS/OIL, ETC.) |
| R4 | EIN | ELECTRIC POWER |
| R5 | CIN | CHILLED WATER RECEIVING |
| R6 | HWIN | HOT WATER RECEIVING |
| Pe | PES | ELECTRIC POWER FOR PLANT |
| W | ITW | EXTERNAL USE WATER |
| S | S | STEAM LOAD |
| S1 | HS | HIGH-PRESSURE STEAM LOAD |
| S2 | LS | LOW-PRESSURE STEAM LOAD |
| S3 | C | CHILLED WATER LOAD |
| S4 | CS | EXTERNALLY SUPPLYING CHILLED WATER |
| S5 | WW | HOT WATER LOAD |
| S6 | WWS | EXTERNALLY SUPPLYING HOT WATER |
| S7 | HW | HOT WATER SUPPLY LOAD |
| S8 | E | ELECTRIC POWER LOAD |

The heat and power supply devices are broadly classified into groups including an electric power generation group device M100, a boiler group device M200, a chilled water group device M300, a hot water group device M400, a lower-temperature chilled water group device M500, a hot water supply group device M600, a cooling tower group device M700 (a common-use cooling tower), a thermal storage group device M800, and a pump group device M900, so that these groups are appropriately combined to construct the heat and power supply facility as described above. For example, Table 1b lists the heat and power supply devices included in the groups M100 through M900. Note that Table 1b is merely illustrative, and for example, a lower-temperature chilled water group electric centrifugal chiller and a lower-temperature chilled water group electric heat pump can also be provided as lower-temperature chilled water group devices so as to supply lower-temperature chilled water. Further, Genelink (registered trademark) is a waste-hot-water-driven absorption chiller that effectively uses waste heat hot water of 100° C. or less that is generated by a gas cogeneration system (a gas engine, a fuel cell). Note that "heat source devices" as used herein represents the heat and power supply devices excluding the electric power generation group devices.

TABLE 1b

| SIGN | ABBR. | NAME |
|---|---|---|
| M100 | GF | ELECTRIC POWER GENERATION GROUP DEVICE |
| M110 | GTGS | GT COGENERATION SYSTEM WITH VARIABLE HEAT POWER RATIO |
| M120 | GTG | GT COGENERATION SYSTEM |
| M130 | CCPC | COMBINED ELECTRIC POWER GENERATION SYSTEM |
| M140 | GTGA | SUPPLEMENTARY-FIRED GT COGENERATION SYSTEM |
| M150 | GECG | GAS ENGINE COGENERATION SYSTEM |
| M200 | BF | BOILER GROUP DEVICE |
| M210 | HB | HIGH-PRESSURE BOILER |
| M220 | LB | LOW-PRESSURE BOILER |

TABLE 1b-continued

| SIGN | ABBR. | NAME |
|---|---|---|
| M300 | CF | CHILLED WATER GROUP DEVICE |
| M310 | ARS | ABSORPTION CHILLER |
| M320 | ARHW | HOT-WATER-DRIVEN ABSORPTION CHILLER |
| M330 | STTB | BACK-PRESSURE TURBINE DRIVEN CENTRIFUGAL CHILLER |
| M340 | TPS | TOPPING SYSTEM |
| M350 | TB | ELECTRIC CENTRIFUGAL CHILLER |
| M360 | FC | FREE COOLING |
| M370(M440) | FC&H | ABSORPTION CHILLER/HEATER |
| M380(M430) | GR | GENELINK |
| M390(M460) | AHP | AIR-COOLED HEAT PUMP |
| M391(M470) | EHP | ELECTRIC HEAT PUMP |
| M392(M830) | AHP&CS | HEAT-STORAGE-INTEGRATED AIR-COOLED HEAT PUMP |
| M400 | WF | HOT WATER GROUP DEVICE |
| M410 | WWH | HOT WATER HEAT EXCHANGER |
| M420 | WWRH | HOT WATER RECOVERY HEAT EXCHANGER |
| M500 | LCF | LOWER-TEMPERATURE CHILLED WATER GROUP DEVICE |
| M600 | HWF | HOT WATER SUPPLY GROUP DEVICE |
| M610 | HWB | BOILER FOR HOT WATER SUPPLY |
| M620 | HWHP | ELECTRIC HEAT PUMP FOR HOT WATER SUPPLY |
| M630 | HWST | HOT WATER SUPPLY TANK |
| M700 | CF | COOLING TOWER GROUP DEVICE |
| M710 | CDT | DEDICATED COOLING TOWER |
| M720 | GCDT | COMMON-USE COOLING TOWER |
| M800 | SF | THERMAL STORAGE GROUP DEVICE |
| M810 | CST | ICE/CHILLED WATER STORAGE TANK |
| M820 | WWST | HOT WATER STORAGE TANK |
| M900 | PF | PUMP GROUP DEVICE |
| M910 | C2SP | SECONDARY CHILLED WATER PUMP |
| M920 | CSP | CHILLED WATER TRANSFER PUMP |
| M930 | WW2SP | SECONDARY HOT WATER PUMP |
| M940 | WWSP | HOT WATER TRANSFER PUMP |
| M950 | HWCP | CIRCULATING PUMP |
| M960 | ITP | WATER INTAKE PUMP |
| H1 | HSHD | HIGH-PRESSURE STEAM HEADER |
| H2 | LSHD | LOW-PRESSURE STEAM HEADER |
| H3 | HHWHD | WASTE HOT WATER HEADER |
| H4 | CHD | CHILLED WATER HEADER |
| H5 | WWHD | HOT WATER HEADER |
| Pc | ERG | POWER RECOVERY |

Figure 2A:
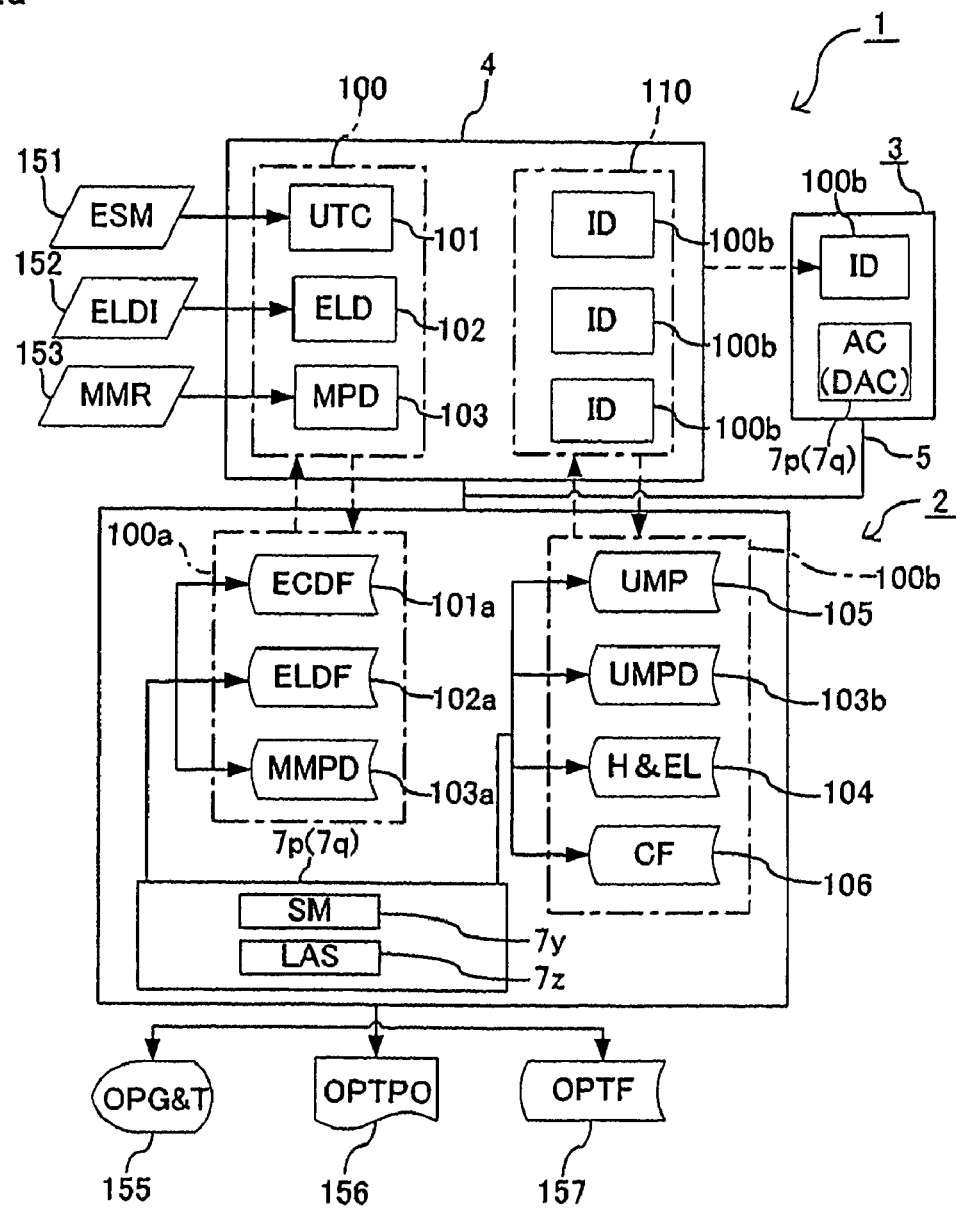
FIG. 2a is a business data flow diagram of the simulation system according to the present invention.
Figure 2B:
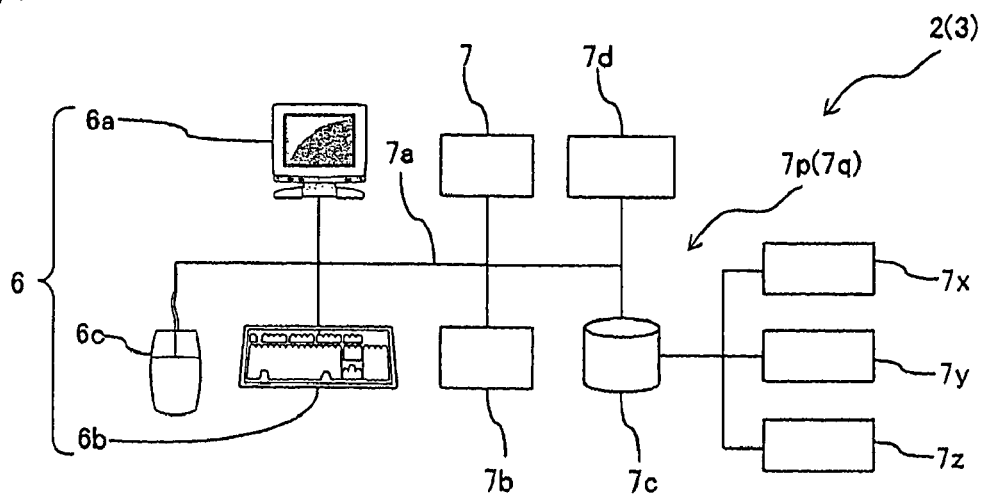
FIG. 2b is a hardware configuration diagram of the simulation system according to the present invention.

Here, a simulation system 1 is configured as shown in FIG. 2a such that a DB server 4 is connected to a plurality of user terminals 2 and an administrator terminal 3 via a network 5. The hardware configuration of each user terminal 2, the administrator terminal 3, and the like is shown in FIG. 2b and Table 1c. The hardware of each terminal generally includes a user interface 6, a CPU 7, and the like, and performs a process by operating data, programs, and the like 7x through 7z.

TABLE 1c

| SIGN | ABBR. | NAME |
|---|---|---|
| 100b | ID | INDIVIDUAL DATA |
| 101 | UTC | ELECTRIC POWER PRICE, ETC. DB |
| 102 | ELD | ENVIRONMENTAL LOAD DB |
| 103 | MPD | DEVICE PERFORMANCE DB |
| 101a | ECDF | ELECTRIC POWER DATA FILE |
| 102a | ELDF | ENVIRONMENTAL LOAD DATE FILE |
| 103a | MMPD | MANUFACTURER'S DEVICE DATA TEMPLATE FILE |
| 103b | UMPD | USER'S DEVICE DATA TEMPLATE FILE |
| 104 | H & EL | HEAT AND POWER LOAD FILE |
| 105 | UMP | USER'S DEVICE DATA FILE |
| 106 | CF | CASE FILE |
| 151 | ESM | ENERGY SUPPLY COMPANY |
| 152 | ELDI | ENVIRONMENTAL LOAD INFORMATION |

TABLE 1c-continued

| SIGN | ABBR. | NAME |
|---|---|---|
| 153 | MMR | FACILITY DEVICE MANUFACTURER |
| 155 | OPG&T | DISPLAY OF OUTPUT GRAPH AND SPREAD SHEET |
| 156 | OPTPO | SIMPLE PRINTING OF OUTPUT SPREAD SHEET |
| 157 | OPTF | OUTPUT SPREAD SHEET FILE |
| 7p | AC | CALCULATION SECTION |
| 7q | DAC | CALCULATION DETERMINATION SECTION |
| 7y | SM | PROCESSING APPLICATION (CALCULATION METHOD) |
| 7z | LAS | LOAD CREATION APPLICATION |

The user interface 6 includes a monitor 6a, a keyboard 6b, and a mouse 6c, for a user to operate a button and an entry field, on the display screen described later. The user interface 6 is connected to the CPU 7, a temporary storage memory 7b, an HDD 7c, a network adapter 7d, and the like via a bus 7a including a data bus, an address bus, and the like. The CPU 7, the temporary storage memory 7b, the HDD 7c, and the like configure a calculation section 7p in cooperation with each other so as to operate the data, the application programs, and the like.

As shown in FIG. 2a, a database ("database" is hereinafter abbreviated as "DB") group 100 of the DB server 4 includes an electric power price etc. DB 101, an environmental load DB 102, and a device performance DB 103. In the electric power price etc. DB 101, information about the price of a supplied energy, such as an electric power price, is stored and saved. In the environmental load DB 102, environmental load data (a unit environmental load) created based on various types of published data is stored. In the device performance DB 103, the partial load characteristics, changes in device efficiency based on an outdoor air temperature and a wet-bulb temperature, and the internal power consumptions, of the devices, constraint conditions of devices incorporated in a system, and the like are stored by type of device of main manufacturers, by fuel, and by capacity, and are incorporated in the system shown in FIG. 1.

A user of the system accesses the DB server 4 via the network 5 using TCP/IP or the like, reads an electric power price data file 101a, an environmental load data file 102a, and a manufacturer's device data template file 103a from the DBs 101 through 103, respectively, and saves the files as read data 100a. This reading makes it possible to use data not listed in a catalog, data of an updated device, data of a new device, and the like.

The electric power price data and the environmental load data can be manually changed to assessment data specific to each user so as to perform a simulation, and are saved in a case file 106. Thus conditions and parameters that are set in the respective setting sections described later can be stored as a case file in the HDD 7c, which is an electronic storage medium. Note that as an electronic storage medium, not only the HDD 7c but also various removable disks such as a magnetic disk, an optical disk, and a RAM can be used.

The user can modify the read data 100a in the system. For example, if device performance data (COP: the abbreviation for Coefficient Of Performance, the same hereinafter) of an absorption chiller has deteriorated over time, the user manually modifies the device data in accordance with the performance to thereby perform a simulation. It is possible to accumulate the modified data in the device template file 103b specific to the user of the system, so as to quantitatively assess the energy loss caused by changes over time in the device.

In the calculation section 7p, the processing application 7y and the load creation application 7z are operated. The load creation application 7z creates a heat and power load in accordance with the state, and saves the load in a heat and power load file 104. Then it is possible to operate these applications so as to save, as the case file 106 and the heat and power load file 104, data of the simulation performed based on the modification to the data corresponding to an energy system to be assessed by the user. For the assessment, it is possible to provide outputs as display 155, simple printing 156, and a file (tabular form) 157, of an output graph and a spread sheet. The user can read the case file 106 to assess an energy conservation effect and the like at any time. Further, any of the heat and power supply devices of the energy system have a partial load characteristic, and the calculation section 7p makes convergence calculations by changing a load factor of the heat and power supply devices corresponding to any item included in a total combined energy so that the amount produced of the item converges on a target value set by an energy load setting section. Furthermore, the calculation section 7p includes a calculation determination section 7q that determines and changes the number of the heat and power supply devices so that the convergence calculations are completed.

For example, if an excess number of heat and power supply devices or inappropriate types of heat and power supply devices are selected by an operating condition setting section 40, it is assumable that the convergence calculations do not converge on the target value. In this case, only an appropriate number, for the heat load, of heat source devices are started up in accordance with operating priorities that are set, and the calculation section 7p makes convergence calculations again based on this number. The electric power generation group devices can be handled by purchasing electric power, and therefore are configured not to be automatically started up, so as to reduce the load used for convergent calculations.

On the other hand, if it is determined that the capacities of the heat and power supply devices that are set are insufficient or the number of the heat and power supply devices is too small to be sufficient, and the convergence calculations are not completed since the calculation result does not reach the target value (e.g., a target chilled water load), the calculation determination section 7q adds one heat source device having the lowest operating priority, and makes convergence calculations again. The convergence calculations are repeated until the calculations are completed, and the number is increased so as to be appropriate for the load. Here, it is considered that a heat source device having the lowest operating priority normally has a low importance in the system configuration of the heat and power supply facility, and therefore affects the entire heat and power supply facility to a small degree. Further, the mere addition of a heat source device having the lowest operating priority makes it possible to simply make recalculations. This makes it possible to quickly perform a simulation without affecting the entire heat and power supply facility to a great degree. Furthermore, the calculation determination section 7q displays on the screen the types of classification of the added heat source devices and the operating periods of time (operating conditions) of the added heat source devices, together with the added number. This enables the user to, with reference to the simulation result, optimally set an operating plan and construct the system of the heat and power supply facility.

If the user wishes to consult energy conservation measure means, the user saves, in an individual data group 110 of the DB server, individual data 100b including a case file and the like created by the user. The case file is read from the administrator terminal 3 so as to make a case study. The case file, which is the result of the consultation, is saved again in the individual data group 110 so that the user refers to the saved case file again. It is possible for the user of the system to visually implement energy conservation measures with a common simulation tool, using the administrator terminal 3 and the DB server 4 as a consultant.

Figure 1B:
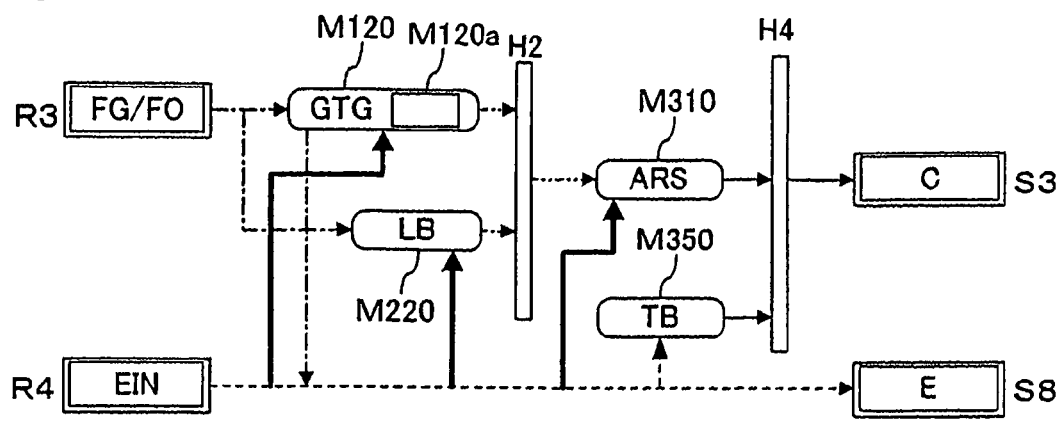
FIG. 1b is a block diagram of the heat and power supply facility according to a first embodiment of the present invention.

FIG. 1b shows the flow of a block included in the heat and power supply facility M according to the present embodiment. The heat and power supply facility M includes a gas turbine cogeneration system M120, a low-pressure boiler M220, an absorption chiller M310, and an electric centrifugal chiller M350. The gas turbine cogeneration system M120 includes an exhaust heat recovery boiler M120a.

Figure 2C:
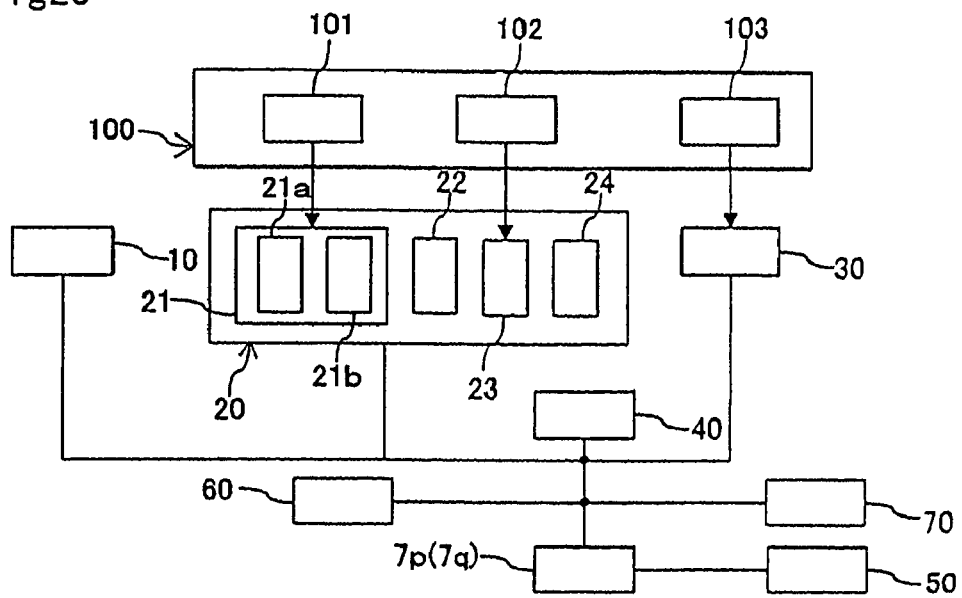
FIG. 2c is a software configuration diagram of the simulation system according to the present invention.

As shown in FIG. 2c, the software configuration of the simulation system 1 according to the present invention generally includes an energy load setting section 10, a basic condition setting section 20, a system configuration setting section 30, an operating condition setting section 40, an operating result output section 50, a case file etc. creation section 60, and a display control section 70. Further, the DB group 100 has stored therein various types of data to be read by the respective setting sections, and includes the electric power price etc. DB 101, the environmental load DB 102, and the device performance DB 103.

The basic condition setting section 20 includes a utility cost setting section 21, a process condition setting section 22, an environmental load setting section 23, and a temperature data setting section 24. The utility cost setting section 21 includes an electric power cost setting section 21a and a fuel cost setting section 21b. Utility costs are obtained by multiplying the amount used of a supplied energy by the price of the energy.

Figure 3:
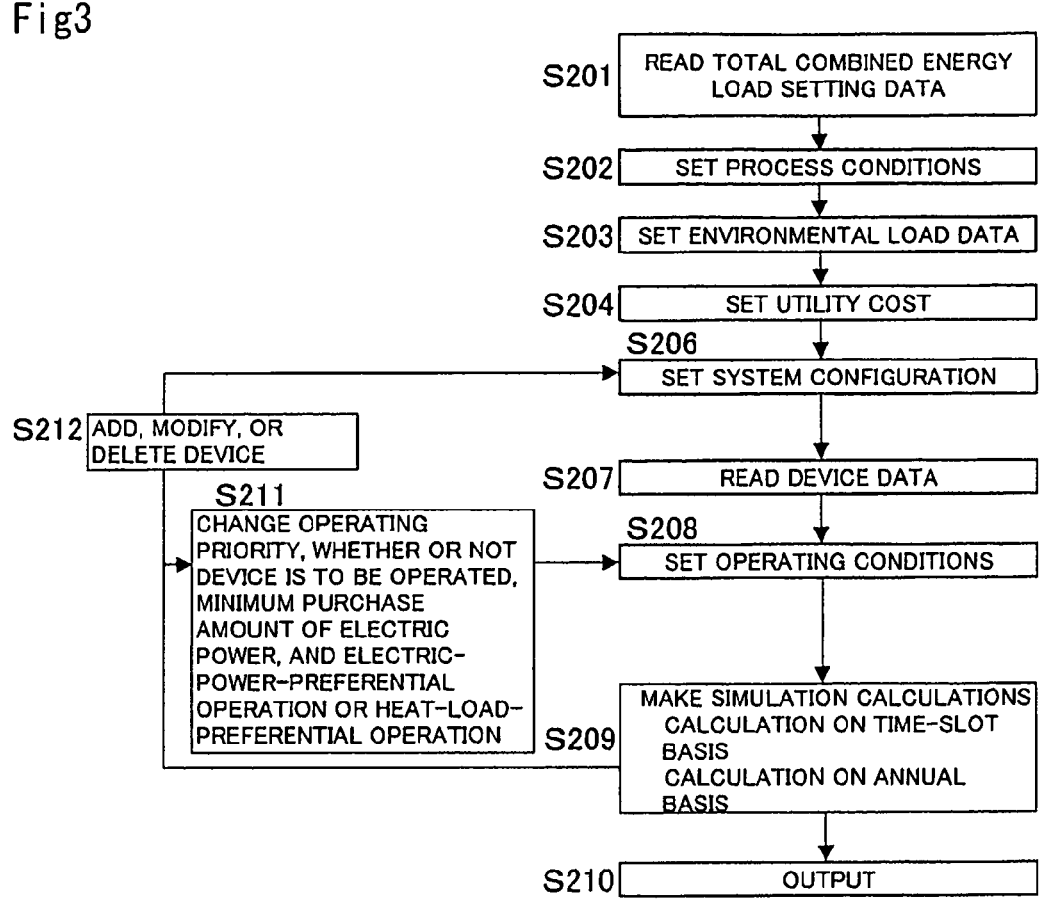
FIG. 3 is a flow diagram showing the setting procedures followed by setting sections.

Here, FIG. 3 shows the setting procedures followed by the setting sections of the simulation system.

In the setting procedures, as shown in FIGS. 2c and 3, first, the energy load setting section 10 sets an energy load (S201). Then the process condition setting section 22 sets the process conditions of a heat medium (S202). Then the environmental load setting section 23 and the utility cost setting section 21 read environmental load data and utility costs from the environmental load DB 102 and the electric power price etc. DB 101, to thereby set the environmental load data and the utility costs, respectively (S203, S204). After these settings, the system configuration setting section 30 selects heat and power supply devices and reads the device performance data of the devices, to thereby construct the heat and power supply facility (S206, S207). Then the operating condition setting section 40 sets the operating conditions of the constructed heat and power supply facility (S208). The state of the construction of the heat and power supply facility is appropriately displayed in a flow diagram via the display control section 70. The conditions set in the above steps can be appropriately saved by the case file etc. creation section 60 as the individual data 100b, such as the user's device template file 103b, the heat and power load file 104, and the case file 106. Further, in the above steps, the settings are performed using the various types of data stored in the DB group 100. The settings, however, can also be performed using the saved individual data 100b.

Then, based on the set conditions, the calculation section 7p performs a time-slot and/or annual simulation (S209). The operating result output section 50 outputs the simulation result in the forms of a graph and a spread sheet as shown in FIGS. 9 and 10 (S210). Alternatively, it is also possible to change conditions and repeat the simulation. In this case, the operating conditions are set by changing: the operating priorities; whether or not a device is to be operated; a minimum purchase amount of electric power; an electric-power-preferential operation, a heat-load-preferential operation, or the like; and the like (S211), while the system configuration is set by performing the addition, modification, deletion, or the like, of a device, for comparative review (S212). Then the simulation is performed again, and the simulation result is output (S209, S210).

Here, with reference to FIG. 8, a description is given of a general balance calculation procedure followed in the above simulation. Hereinafter, an energy balancing step is abbreviated as "EB".

As shown in FIG. 8, the general procedure includes a chilled water EB (S01), a hot water EB (S02), a low-pressure steam EB (S03), a high-pressure steam EB (S04), a gas engine waste hot water EB (S05), a hot water supply EB (S06), and an electric power EB (S07). Thus the total combined energy is sequentially calculated, based on the conditions set in the above steps, such that a steam energy is calculated before an electric power energy is, and another energy is calculated before the steam energy is.

In the energy load setting (S201), the energy load setting section 10 sets the amount of the combined energy that is required per month, per day, and per pattern, in the utilization facility per time slot. For example, as shown in FIG. 4, the following are set: an outdoor air temperature; a wet-bulb temperature; a chilled water load and an electric power load, as heat and power load data; a chilled water supply temperature; and a chilled water return temperature. The outdoor air temperature is related to the inlet air temperature of the gas turbine, and the inlet air temperature is used as parameters for the amount of generated electric power of the gas turbine. In the device performance data described later, the inlet air temperature is defined as outdoor air temperature+arbitrary temperature, e.g., +2° C.

The wet-bulb temperature affects a cooling water temperature, is used as a variable for the performances (COPs) of the absorption chiller and the electric centrifugal chiller, and is related to the consumption of electric power and the consumption of fossil fuel. In the device performance data described later, the cooling water temperature is defined as wet-bulb temperature+arbitrary temperature, e.g., +5° C. The outdoor air temperature and the wet-bulb temperature are set using, for example, data downloaded from the website of a Meteorological Agency. Further, as well as the outdoor air temperature and the wet-bulb temperature, a river water temperature, a seawater temperature, and the temperatures of sewage water, well water, and the like can also be set per month on a time-slot basis.

When the heat and power supply facility has already been operating, the heat and power load data of a chilled water load, a lower-temperature chilled water load, a hot water load, a low-pressure steam load, a high-pressure steam load, a hot water supply load, an electric power load, and the like can be set using the heat and power load data collected during the operation. Further, the energy load setting can be performed such that up to eight patterns of loads can be set for each of 12 months as 24-hour data, and loads can also be set for a summer design day and a winter design day. Here, for a summer design day, for example, a load is set as a predictable maximum load for cooling, for example, by increasing the load by 15% in August. Similarly, for a winter design day, for example, a load is set as a predictable maximum load for warm heat, for example, by increasing the load by 15% in February. Furthermore, the supply temperature and the return temperature, of each of chilled water, lower-temperature chilled water, and hot water can also be similarly set.

Note that the outdoor air temperature and the wet-bulb temperature that are described above can also be set by the temperature data setting section 24. It is possible to select between whether to use the outdoor air temperature and the wet-bulb temperature that are set by the energy load setting section 10 or to use those set by the temperature data setting section 24. This makes it possible to quickly review cases different in installation location by switching the outdoor air temperatures and the wet-bulb temperatures. Further, the temperature data setting section 24 also sets a river water temperature, a seawater temperature, and the like, as well as the outdoor air temperature and the wet-bulb temperature.

Next, in the process condition setting (S202), the process condition setting section 22 sets the process conditions of a heat medium, such as: basic conditions; fuel data; an electricity group and a steam group; and the type of recovered steam of the gas turbine and the like. The process condition setting section 22 selects whether or not to use the temperature difference in the heat medium, the outdoor air temperature, and the wet-bulb temperature that are set by the energy load setting section 10, and sets the target temperature difference between the supply temperature and the return temperature, of each of chilled water, hot water, and lower-temperature chilled water, and also sets a minimum bypass flow rate of each of chilled water, hot water, and lower-temperature chilled water. The process condition setting section 22 also sets conditions (a pressure (MPaG), a steam enthalpy (kJ/kg), a return water enthalpy (kJ/kg), a steam recovery rate (%)) of high-pressure steam and low-pressure steam.

Here, in the calculation procedure of a steam enthalpy, a steam pressure is first set. Then when either one of saturated steam and superheated steam is selected as the type of steam, it is determined whether the steam pressure is that of superheated steam or that of saturated steam. When the steam pressure is that of saturated steam, a saturated steam enthalpy is calculated based on the set pressure, and the calculation result is input as the steam enthalpy. On the other hand, when the steam pressure is that of superheated steam, a superheated steam enthalpy is calculated upon input of the superheated steam temperature, and the calculation result is input as the steam enthalpy. Note that the pressures of high-pressure steam and low-pressure steam can be individually set, and the calculation procedures of the pressures are the same.

For example, when the target temperature difference in chilled water is set to 5° C.; the minimum bypass flow rate of chilled water is set to 0; and the pressure of low-pressure (saturated) steam is set to 0.785 MPaG, which is the steam condition of the absorption chiller, 2770.9 kJ/kg is input as the calculation result of the enthalpy of low-pressure (saturated) steam.

In the process conditions of fuel, the heating value and the specific gravity, of each of gas, heavy oil, kerosene, and other oil are set. The settings of the electricity group and the steam group are performed by setting the following: the breakdowns of the electric power load and the low-pressure steam load, of the heat and power load data; the supply destination of generated electric power; the type of recovered steam of the gas turbine, a supplementary-fired gas turbine, and the gas engine; and the electric power recovery based on the reduction of the pressure of steam.

The breakdown of the electric power load of the heat and power load data is set by selecting whether the electric power load set by the energy load setting section 10 is an electric power load to be supplied to a facility other than the heat and power supply facility or is an electric power load including electric power to be used in the heat and power supply facility. Based on the setting of the load to be supplied to a facility other than the heat and power supply facility, the electric power load set by the energy load setting section 10 is set as electric power to be supplied to the utilization facility.

Similarly, the breakdown of the low-pressure steam load of the heat and power load data is set by selecting whether the low-pressure steam load is a steam load to be supplied to a facility other than the heat and power supply facility or is a steam load to be generated in the heat and power supply facility. When the low-pressure steam load is to be supplied only to a facility other than the heat and power supply facility, the set steam load is that of steam to be supplied to the utilization facility. Further, when an entire steam load (the steam load from a steam generator) is selected, steam is supplied to the utilization facility, and steam is also used in the heat and power supply facility. Thus the entire steam load is set so as to correspond to the total flow rate of steam generated by the steam generator. The electric power load and the steam load are used for a simulation, and the simulation result is output in the forms of a spread sheet and the like.

In addition, the electric power recovery based on the reduction of the pressure of steam is set with respect to an electric power recovery facility that can recover electric power when high-pressure steam has surplus steam generated and is reduced to low-pressure steam. In this case, the amount of high-pressure steam and the enthalpy of exhaust steam that are required for a maximum amount of generated electric power and the amount of generated electric power at a partial load are set. Note that in the heat and power supply facility M according to the present embodiment, high-pressure steam is not reduced to low-pressure steam, and therefore these settings are not performed therein.

The type of recovered steam is set by selecting whether the steam to be generated by the electric power generation group device (the gas turbine, the supplementary-fired gas turbine, and the gas engine) is low-pressure steam or high-pressure steam. For example, when "low-pressure steam" is set, the supply destination of the steam from the exhaust heat recovery boiler M120*a* of the gas turbine M120 is specified so that the steam is to be supplied to the low-pressure steam side.

The supply destination of generated electric power is set by selecting from among: sharing the electric power of each of the heat and power supply facility and the utilization facility; sharing the electric power of only the heat and power supply facility; and sharing the electric power of only the utilization facility. Thus it is determined where to supply the electricity generated by the electric power generation group device for use. For example, when "sharing the electric power of each of the heat and power supply facility and the consumer (utilization facility)" is selected, electric power is supplied to both the utilization facility and the heat and power supply facility. It is set so that electric power is generated in accordance with a total electric power, and if the generated electric power is insufficient, additional electric power is purchased to cover the shortfall.

When "supplied to the heat and power supply facility" is selected for the supply destination of electric power, electric power is balanced so that the electric power generation group device generates electric power in accordance with the electrical energy to be consumed by the heat and power supply facility. Further, when "only the consumer" is selected, electric power is balanced so that the electric power generation group device generates electric power in accordance with the electrical energy of the devices except for the heat sources. That is, the amount of electric power to be generated by the electric power generation group device varies depending on the determination of the supply destination of generated electric power.

Figure 6:
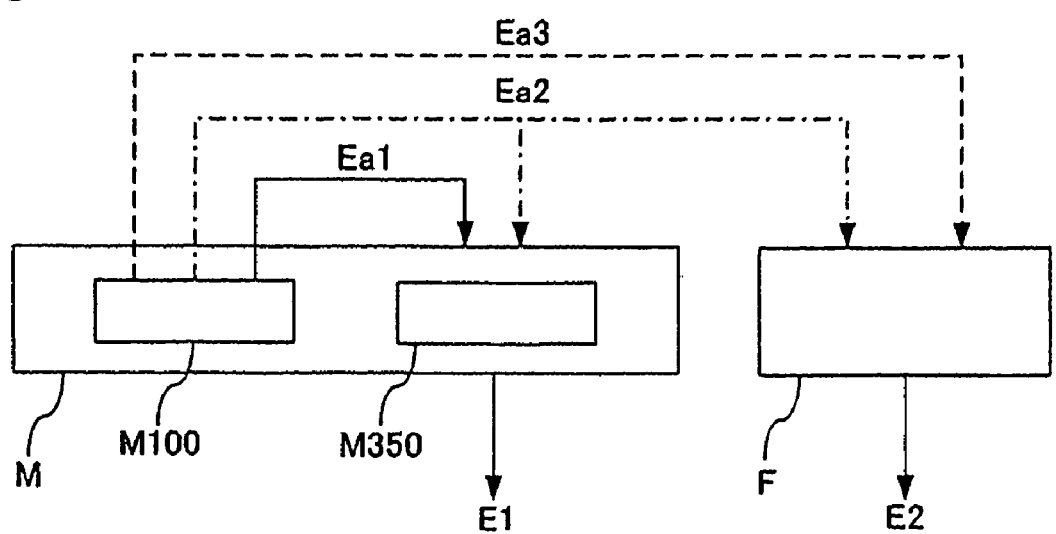
FIG. 6 is a schematic diagram illustrating switching for selection of an electric power load.

As shown in FIG. 6, in the case where: the electrical energy to be consumed by the heat and power supply facility M is E1; the electrical energy to be consumed by a utilization facility F is E2; and the amount of generated electric power of the electric power generation group device M100 is Ea (Ea1 through Ea3), when electric power is used only in the heat and power supply facility M (for example, is supplied to the electric centrifugal chiller M350), convergence calculations are made if case of Ea1>E1, so that electric power does not flow back. When electric power is used in both the heat and power supply facility M and the utilization facility F, convergence calculations are made if Ea2>E1+E2, so that electric power does not flow back. When electric power is used only in the utilization facility F, convergence calculations are made if Ea3>E2, so that electric power does not flow back. That is, the amount of electric power to be converged on varies. This is also true of steam.

Thus it is possible to make an energy assessment of an electric power load by switching for selection between whether the electric power load is used only in the utilization facility or is used in both the utilization facility and the heat and power supply facility. It is also possible to make an energy assessment of a steam load by switching for selection between whether the steam load is used only in the utilization facility or is used in both the utilization facility and the heat and power supply facility.

In the heat and power supply facility M of FIG. 1b, the settings of basic conditions are performed by setting the target temperature difference in chilled water, the pressure of low-pressure steam, and the enthalpy of the low-pressure steam. The setting of fuel data is performed by setting the lower heating value and the specific gravity, of gas. The settings of conditions of the electricity group and the steam group are performed by setting the breakdown of an electric power load so that the electric power load is supplied to only a facility (the utilization facility) other than the heat and power supply facility, and setting the breakdown of a steam load so that the steam load is supplied to only a facility (the utilization facility) other than the heat and power supply facility. The type of recovered steam of the gas turbine and the like is set as low-pressure steam.

In the environmental load data setting (S203), the environmental load data setting section 23 sets environmental load data. Specifically, the environmental load data is set by multiplying the environmental load data (a unit environmental load) by: each of the consumption of electric power, the consumption of fossil fuel, and the consumption of other fuel that have been obtained based on the conditions set by the energy load setting section 10, the basic condition setting section 20, the system configuration setting section 30, and the operating condition setting section 40, so as to output an environmental load (a primary energy, $CO_2$, NOx, SOx). The data to be set includes the emissions intensity and the crude oil equivalent, of each of $CO_2$, NOx, and SOx, with respect to electric power, gas, kerosene, heavy oil, and other oil. For electric power, a primary energy equivalent is further set. Further, electric power can be set per time slot such as in daytime and nighttime.

Next, in the utility cost setting (S204), the electric power cost setting section 21a and the fuel cost setting section 21b set electric power costs and fuel costs. The electric power cost setting section 21a sets electric power costs defined by the type of electric power contract, the type of added optional clause, and the electrical energy to be consumed.

The type of electric power contract is set by selecting any of the types of contracts of high-voltage/extra-high-voltage electric power, seasonal and time-slot electric power, and time-slot electric power. For example, in the case of the high-voltage/extra-high-voltage electric power contract, the demand charge unit price, the contract electric power, the power factor, and the monthly meter unit price, of the high-voltage/extra-high-voltage electric power contract are set. Further, the addition of an optional clause is set by appropriately selecting an optional clause from among a peak electric power regulation contract, a standby electric power contract, a thermal storage regulation contract, an emergency electric power contract for private power generation, and an ancillary service.

In addition, the fuel cost setting section 21b sets fossil fuel costs and other fuel costs. A gas price is set such that the following are set for the demand charge of the gas price: items to be set for each of a fixed demand charge and a demand charge according to a flow rate, by summertime and wintertime; and a summer meter unit price and a winter meter unit price, per month. Further, in the field of oil fuel price, the unit prices of heavy oil, kerosene, and other oil are each set per month.

In the system configuration setting (S206), the system configuration setting section 30 constructs the system configuration of the heat and power supply facility M. In the present embodiment, the gas turbine electric power generator, the low-pressure boiler, the absorption chiller, and the electric centrifugal chiller are selected and set. The system configuration setting section 30 is capable of arbitrarily setting, among the heat and power supply devices, a plurality of heat and power supply devices that are of the same type, that differ in capacity, that differ in energy source for operation, or that differ in manufacturer, so as to cause each of the heat and power supply devices to operate in accordance with the operating conditions set by the operating condition setting section 40.

The performance data of each of the heat and power supply devices is stored in the device performance DB 103 of the DB group 100, and is read in the device data reading (S207) to be thereby set. The device performance DB 103 is stored by classifying and organizing each group of the devices by device, by manufacturer, by model number, by fuel, by capacity, and by performance. The performance data is read by selecting the types of classification via the system configuration setting section 30 and the display control section 70.

The display control section 70 displays the heat and power supply facility as a flow diagram as shown in FIG. 1a, and constructs the system of the heat and power supply facility in the flow diagram. The flow diagram is a diagram in which a plurality of the heat and power supply devices that can form the heat and power supply facility M, the supplied energy that is supplied to the heat and power supply facility M and received by each of the heat and power supply devices, and the total combined energy that is produced by the heat and power supply facility M and supplied to the utilization facility, are connected to each other by connecting lines so as to be associated with each other in advance.

In the heat and power supply devices, the energy to be received and the energy to be produced and supplied are specified by the type of the heat and power supply device. This makes it possible to create in advance a flow diagram of the heat and power supply facility, in which the heat and power supply devices and the energies to be received and/or produced by the respective heat and power supply devices are connected to each other by connecting lines so as to be associated with each other. The connecting lines are assigned to the energies to be received and/or produced.

When any of the heat and power supply devices are selected in the flow diagram, the heat and power supply devices and the energies that are set are distinguishably displayed, and therefore it is possible to visually understand the relationships between the heat and power supply devices and the energies. This makes it possible for even a nonexpert to construct the system of the heat and power supply facility M. Note that solid lines shown in FIG. 1b represent the internal electric power of each of the devices M120, M220, M310, and the like. The internal electric power contributes to a change in an energy balance, and therefore convergence calculations are made so as to maintain the energy balance. The flow diagrams shown in FIGS. 1a and 1b are merely illustrative, and can be appropriately set. A plurality of flow diagrams may also be created and stored in advance.

Next, a description is given of the system configuration of the heat and power supply facility M in the flow diagram.

As shown in FIG. 1a, in an initial display of the flow diagram, components such as the heat and power supply devices are displayed in a faded manner. Then, when for example, the low-pressure boiler M220 is selected, the setting of the device data of the low-pressure boiler M220 is started. The setting of the device data is performed, for example, using the device data template file (device performance data) 103a read from the device performance DB 103 and saved. Alternatively, the setting can also be performed using the user-specific device template file 103b manually modified and saved as appropriate by the user.

Figure 1C:
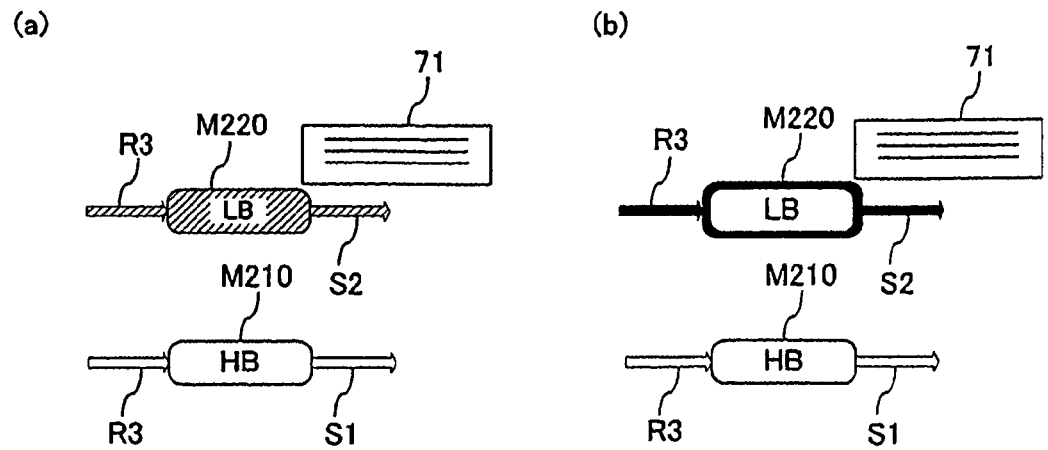
FIG. 1c (a) and (b) is diagrams showing examples of the display form of a flow diagram of the heat and power supply facility.

Then, as shown in FIG. 1c (a), the heat and power supply devices whose device data has been read are displayed in a darker manner than in the initial display, and are displayed so as to be distinguishable from other heat and power supply devices. This makes it possible for the user to visually recognize and easily confirm the state of the system configuration. Note that "distinguishable" represents the manner where heat and power supply devices that have not been read and heat and power supply device that have been read can be visually distinguished from each other on the display screen. As well as the shadings of displays, for example, as shown in FIG. 1c (b), the thicknesses of lines or the colors may be changed, or both the colors and the shadings may be changed. Alternatively, the above settings may be performed by directly inputting the device data.

The selected low-pressure boiler M220 is connected in advance to the fuel R3 as the energy to be received, and is connected in advance to the steam S2 as the energy to be produced, by connecting lines associating the low-pressure boiler M220 with the fuel R3 and the steam S2 in advance. Thus the selection of the low-pressure boiler M220 associates the fuel R3 and the steam S2 with the selection, and also causes the connecting lines and the energies to also be distinguishably displayed. Further, a low-pressure header H2, which is to be supplied with the steam S2 by the low-pressure boiler M220, is also distinguishably displayed. This makes it possible to visually comprehend the flow of the energies in the flow diagram. Then other heat and power supply devices are sequentially selected to thereby construct the heat and power supply facility M. Note that it is also possible to set a plurality of heat and power supply devices of the same type.

Here, in the heat and power supply devices whose device data has been read, there are items to be manually set by the user when a simulation is to be performed. Thus it is conceivable that some of the items to be manually set may be omitted. Accordingly, when the reading and the setting of a heat and power supply device are normally completed, the display control section 70 makes display, as a completion display, to further distinguishably indicate that change of the setting is completed. Here, the "completion display" represents a display that indicates, among the distinguishably displayed heat and power supply devices, a heat and power supply device whose reading and setting are normally completed, so as to be distinguishable from heat and power supply devices, for example, some of whose settings are omitted, to thereby differentiate the heat and power supply device whose reading and setting are normally completed from the heat and power supply devices some of whose settings are omitted. Thus the "completion display" also includes a display (warning display) that indicates a heat and power supply device whose setting is omitted, in a different manner from a heat and power supply device that is normally set. The completion display only needs to be made in such a manner as to differentiate a heat and power supply device that is normally set from other heat and power supply devices, and therefore, as well as the shadings of displays and the thicknesses of lines, the colors may be changed, or both the colors and the shadings may be changed. This makes it possible to visually warn the user and lead to the normal completion of the setting. Alternatively, when the setting has been modified, the completion display may be made by changing the manner of the display. Note that it is also possible to make display in such a manner as to make a further differentiation, depending on the importance of the omitted setting items.

In addition, as shown in FIG. 1c, the selection of heat and power supply devices whose device data has been read causes the display control section 70 to display the number and the basic capacities of the heat and power supply devices in the flow diagram. For example, as shown in FIG. 1c, the display control section 7 displays the design capacity, the number, and the manufacturer's name, of each type of the low-pressure boiler M220 set in a display window 71. This information makes it possible to easily confirm at least the set conditions of the heat and power supply devices in the flow diagram. Then the operating condition setting section 40 sets the operating conditions of the heat and power supply devices of the heat and power supply facility M whose system configuration is completed. Note that it is possible to appropriately output and print the flow diagram and the above information.

The system configuration is not limited to that of the flow diagram described above. For example, the type of classification of a device to be set may be selected on an initial screen, not shown in the figures, and the device is selected on a selection screen of the selected type of classification. For example, the chilled water group is selected from a list as shown in Table 1b, and the absorption chiller is also selected, to thereby display all the types of devices corresponding to the absorption chiller, of all the manufacturers, whose product names, model numbers, types of fuel, and the like are written. Then a manufacturer is selected to thereby display devices of all the types whose device names, model numbers, capacities, and the like are indicated. Then a list, required for the selection of a device, that indicates the cooling capacities (kW, URST), the COPs, and the like is displayed based on the capacities of the selected devices, and then the principal specifications, common conditions, remarks, and the like, of the devices are confirmed to thereby select a device. Then the device data of the selected device is downloaded, and the file of the device data is saved. Then the settings are read via the system configuration setting section 30. The absorption chiller is classified into the chilled water group, and therefore the selected device is regarded as a chilled water group device to thereby construct the heat and power supply facility M. Thus the heat and power supply devices are classified, and therefore even with a heat and power supply facility including a variety of heat and power supply devices as shown in Tables 1a and 1b, it is possible to easily and freely construct the heat and power supply facility by reading settings from the device performance DB 103.

The heat and power supply devices included in the heat and power supply facility are classified into groups and organized by type of device. Thus a device classified into one of the groups including at least the electric power generation group, the boiler group, the chilled water group, the hot water group, the lower-temperature chilled water group, and the hot water supply group is selected, and the device data of the selected device is read. Then the device is regarded as a device selected in the corresponding group, and the setting can be performed by associating the heat and power supply devices with each other, and the heat and power supply devices with the groups of the total combined energy and the supplied energy, in accordance with the functions of each group. Consequently, when the device data has been read, the devices are appropriately connected to each other, and therefore can serve to share loads determined based on a balance between the groups. Note, however, that the selection of the devices merely constructs the heat and power supply facility, and the devices are operated in accordance with the operating priorities set by the operating condition setting section 40.

Here, a description is given of the device performance data of the heat and power supply devices read from the device performance DB 103 as described above.

Figure 5:
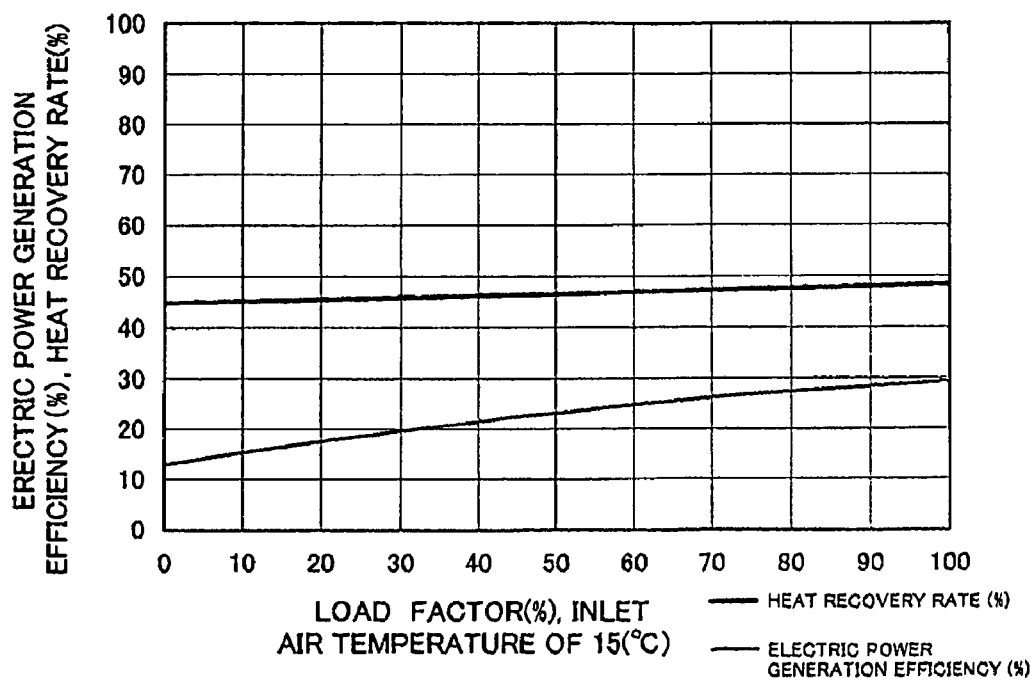
FIG. 5 is a graph of partial load characteristics of an electric power generation efficiency and a heat recovery rate, at 15° C., in device performance data of a gas turbine cogeneration system.

The device performance data of the gas turbine cogeneration system M120 includes the relationships between the operating load factor (%), the electric power generation efficiency (%), and the exhaust heat recovery boiler heat recovery rate (%), of the gas turbine at inlet air temperatures (e.g., 0° C., 15° C., 30° C.) as shown in Table 2. Based on these relationships, the performance at the time at the outdoor air temperature set by the energy load setting section 10 is determined. The settings as shown in Table 2 are performed to thereby determine, based on a multivariate regression equation model where explanatory variables are an inlet air temperature and a load factor, an electric power generation efficiency and a heat recovery rate at an inlet air temperature of 15° C. and a load factor, as shown in FIG. 5. Further, the inlet air temperature can be changed, and therefore it is possible to display a performance curve at each temperature as a graph similar to that of FIG. 5 by changing the inlet air temperature. Thus, as for temperature performances at a temperature other than those set, the electric power generation efficiency and the heat recovery rate are determined based on the inlet air temperature and the load factor, using this regression equation.

In addition, the settings of an output limitation, and the consumption of electric power of an auxiliary device and the start-up loss are performed. The setting of the output limitation is performed by setting: inlet air temperatures (° C.) of an operating lower limit, of an operating upper limit, and at the start of limitation; the value of a ratio (%) to a rated output; and whether the approximation of the output limitation is a straight-line approximation or a quadratic-curve approximation. The setting of the consumption of electric power of the auxiliary device is performed by setting outputs (%) of a rated load and a partial load (under a 50% load operation). Further, a minimum load factor is set where the gas turbine needs to be stopped. The relationship between the inlet air temperature and the outdoor air temperature is set such that for example, inlet air temperature=outdoor air temperature +2° C. For example, the ratio by weight (%) of water/steam injection to gas is set, the water/steam injection reducing NOx generated by the gas turbine. The percentage of the start-up energy loss (corresponding to a rated operation (at 15° C. and a load factor of 100%)) is set.

In addition, the following are set: the capacities, the number, and the fuel, of main devices; an NOx value; the capacity per gas turbine; and the amount of blowdown from the exhaust heat recovery boiler used to calculate the consumption of water. Further, a place to which the heat from the gas turbine is to be exhausted is set. When the outdoor air temperature increases, the electric power generation output decreases, and therefore it is possible to set inlet air cooling. Note that inlet air cooling is not employed in the heat and power supply facility shown in FIG. 1b, and therefore is not set therein.

The device performance data of the gas turbine cogeneration system M120 is read by the system configuration setting section 30, selecting the electric power generation group, the capacity, the manufacturer, and the like from the device performance DB 103. Based on the reading of the data, the data is set. In the present embodiment, the connection destination of the steam generated by the exhaust heat recovery boiler of the cogeneration system is set so that the generated steam is to be supplied to the low-pressure steam side, which is set as the type of recovered steam of the gas turbine and the supplementary-fired gas turbine by the process condition setting section 22. Low-pressure steam is generated such that the pressure and the enthalpy, of the generated low-pressure steam are a low-pressure steam pressure of 0.785 MPaG and a low-pressure steam enthalpy of 2770.9 kJ/kg, respectively, which are set by the process condition setting section 22.

The setting of the device performance data of the low-pressure boiler M220 is performed by setting thermal efficiencies (%) to be obtained at a plurality of arbitrary load factors (%) of the low-pressure boiler. Similarly to the above, the following are set: the amount of blowdown; the capacities, the number, and the fuel, of main devices; an NOx value; and the consumption of electric power of an auxiliary device and the start-up energy loss. Similarly to the above, the device performance data of the low-pressure boiler M220 is also set based on the reading of the data. Similarly to the above, the connection destination of the steam generated by the low-pressure boiler, and the pressure and the enthalpy, of the generated low-pressure steam are set based on the conditions set by the process condition setting section 22.

The setting of the device performance data of the absorption chiller M310 is performed by setting the COPs to be

TABLE 2

| | INLET AIR TEMPERATURE (° C.) | | | | | | | | | | | |
|---|---|---|---|---|---|---|---|---|---|---|---|---|
| | 0 | | | | 15 | | | | 30 | | | |
| LOAD FACTOR (%) | 80 | 80 | 90 | 100 | 80 | 80 | 85 | 100 | 80 | 80 | 85 | 100 |
| ELECTRIC POWER GENERATION EFFICIENCY (%) | 28.91 | 28.9 | 29.4 | 30 | 27.5 | 27.5 | 28 | 29.4 | 27.5 | 27.5 | 28 | 29.38 |
| HEAT RECOVERY RATE (%) | 44.2 | 44.2 | 44.7 | 46 | 47.07 | 47.07 | 47.6 | 49.16 | 47.07 | 47.07 | 47.6 | 49.16 | obtained under a chilled water mode operation at a plurality of arbitrary partial load factors. Based on these settings, similarly to the above regression equation, the relationship between parameters including the COP to be obtained in each mode and the cooling water temperature, and the COP (%) that varies, is set. Further, the design temperature difference in each of chilled water and cooling water is set. The cooling water temperature can be set by adding an arbitrary temperature to an outdoor air wet-bulb temperature, and temperature data of river water and seawater, e.g., wet-bulb temperature +5° C., and the lower limit value of the cooling water temperature is also set where the device can be operated. Furthermore, the CPO to be obtained in each mode and the outlet temperature may be added to the parameters. This is also true of each device described below.

The following are similarly obtained by the above regression equation: the relationship between parameters including the chilled water mode COP and the cooling water temperature, and the COP (%) that varies; and the relationship between parameters including the wet-bulb temperature, and the capacity of the cooling tower. Further, the following are set: the number; the design capacities; the actual capacities (capacities, for example, that have deteriorated based on changes over time); the capacity and the consumption of electric power per fan of an accessory cooling tower; the capacity of the accessory cooling tower; and the concentration ratio of feed water of the accessory cooling tower; of main devices. The relationship between the outdoor air wet-bulb temperature and the cooling capacity, of the accessory cooling tower is set using the above regression equation.

In addition, the consumptions of power of pumps and the like are set. The settings of the consumptions of power of the pumps are performed by setting the heads of a chilled water pump and a cooling water pump. The heads vary depending on the facility, and therefore are manually input. Further, a method of controlling the flow rate of each pump is set as, for example, that of a fixed flow rate. Furthermore, similarly to the above, the consumption of electric power of an auxiliary device and the start-up energy loss of the absorption chiller are set.

Here, in the calculation procedure of the pump efficiencies, when the heads are set, the pump efficiencies and the like are automatically calculated and set. Note that a description is given taking pump efficiencies as an example; however, motor efficiencies are also similarly calculated. In this example, the specific gravities of chilled water and cooling water, both of which are water, are 1.

First, the pump capacities are calculated. The pump capacities are calculated by internal calculations based on the amounts of heat for treatments by the heat and power supply devices and based also on temperature differences. The pump efficiencies are obtained using the obtained pump capacities. Note that an A-efficiency of JIS B 8313 is approximated by a logarithmic cubic polynomial of the pump capacities. Then the motor shaft powers are obtained to thereby calculate the motor allowance rates based on the pump shaft powers corresponding to the obtained motor shaft powers. The pump heads are obtained with reference to the values input as described above. The required motor powers are calculated based on the obtained motor allowance rates and motor shaft powers. The motor efficiencies are calculated based on the obtained required motor powers. Then the motor/pump overall efficiency is calculated based on the obtained motor efficiencies and pump efficiencies, and the calculation result is set as the pump efficiencies. Further, the pump capacities, the pump shaft powers, and the required motor powers that are obtained in the above step are stored as internal data.

In addition, a place to which the heat generated by the absorption chiller is to be exhausted is set. It is possible to select between whether the heat is exhausted from the accessory cooling tower or from the common-use cooling tower. Further, it is also possible to select between whether the heat is directly exhausted to river water/seawater, which is external use water W shown in FIG. 1a, or is indirectly (via a heat exchanger) exhausted to river water/seawater, instead of being exhausted from these cooling towers. The external use water W includes sewage water, well water, sewage treatment water, and the like, as well as river water/seawater. When river water/seawater is selected, the heat is exhausted using the temperature data set by the temperature data setting section 24 of the basic condition setting section 20. When the heat is directly exhausted to seawater, seawater is selected, and the heat is exhausted to seawater based on the written temperature conditions and is dissipated to the sea. When the heat is indirectly exhausted, a water pump M960 shown in FIG. 1a is added to the heat and power supply facility, and the exhaust heat is exchanged and similarly dissipated to the sea.

When the heat and power supply facility includes heat pumps such as an air-cooled heat pump and an electric heat pump, it is also possible to similarly perform the setting of heat collection. The air-cooled heat pump is a device that collects heat from an outdoor air temperature (air) to produce hot water (heat). The electric heat pump is a device that can collect heat from the cooling tower or the external use water W to produce hot water (heat). Hot water is used for heating, and therefore the load increases in wintertime. Thus the COP of the air-cooled heat pump, which collects heat from the air having a low outdoor air temperature, is low, and therefore the efficiency decreases. On the other hand, the temperature of the external use water W is higher than the outdoor air temperature even in wintertime. Thus it is possible to efficiently generate heat with a high COP by the electric heat pump collecting heat from the external use water W. For example, the heat collection source of the electric heat pump is set by selecting river water/seawater. Similarly to the above, the performance data of the absorption chiller M310 is also set based on the reading of the data. The supply of steam, and the pressure and the enthalpy, of low-pressure steam are set, similarly to the above.

The setting of the device performance data of the electric centrifugal chiller M350 is performed by setting the capacities and the number of main devices. The COPs to be obtained under a chilled water operation at partial load factors are set, and the relationship between parameters including the chilled water COP and the cooling water temperature, and the COP (%) that varies, is set. The design temperature difference in chilled water, the design temperature difference in cooling water, and the cooling water temperature are set. These settings are similar to those of the absorption chiller. Further, the following are also similarly obtained by the above regression equation: the relationship between parameters including the chilled water COP and the load factors, and the COP that varies; and the relationship between parameters including the chilled water COP and the cooling water temperature, and the COP (%) that varies. Furthermore, the pump efficiencies and the destination of exhaust heat are also set similarly to those of the absorption chiller, and are set based on the reading of the device data.

Note that in the device performance data of each device, it is possible to arbitrarily change the performance and the like, and provide comments about the reason for the change and the like, using the system configuration setting section 30. Further, it is possible to save the changed device performance data as the device template file 103b. Furthermore, it is possible to confirm the principal specifications of each device at any time, so as to use the principal specifications as the device data.

In the operating condition setting (S208), the operating condition setting section 40 sets whether or not each of the heat and power supply devices is to be operated per time slot, which is set per month, per day, and per pattern, and/or sets the operating priority of each of the heat and power supply devices per time slot, which is set per month, per day, and per pattern. Based on these settings of the operating conditions, an operating plan of the heat and power supply devices is constructed.

As shown in FIG. 7, an operating plan in daytime of the electric power generation group device and the boiler group device is set. On this setting screen, a period of daytime (e.g., from 8:00 hrs. to 22:00 hrs.) is divided into two arbitrary time slots, and up to a sixth operating priority is arbitrarily set per time slot in accordance with the state of the load of each device. Note that FIG. 7 is merely illustrative, and it is possible to appropriately increase or decrease the number of time slots and operating priorities that can be set. For example, it is also possible to divide a period of time from 8:00 hrs. to 22:00 hrs. into six arbitrary time slots and set up to an eighth operating priority per time slot. Further, an operating mode is set by selecting whether an operation is performed under a preferential operation of electric power load or under a preferential operation of heat load. In FIG. 7, from 8:00 hrs. to 18:00 hrs., the operations of the low-pressure boiler and the gas turbine cogeneration system are set, and the electric power generation group devices are operated under the preferential operation of electric power load. Also from 18:00 hrs. to 22:00 hrs., the operations of the low-pressure boiler and the gas turbine cogeneration system are set, and the operating mode is selected such that the electric power generation group devices are operated under the preferential operation of heat load. The item for setting a minimum purchase amount of electric power in daytime defines a minimum purchase amount of electrical energy to be purchased from an electric power company, and is set to 0 kW in FIG. 7.

In addition, a mode is selected and set for each electric power generation group device to share a load, so as to specify the mode of controlling the operations of a plurality of the electric power generation group devices. In FIG. 7, an example is shown where "only the last device at a partial load" is set. "Only the last device at a partial load" is set when the amount of generated electric power is adjusted by operating at a partial load the device designated as the last in the operating priorities. Alternatively, it is also possible to set "all the GTs/all the GEs are operated at the same load" and "only the last models at a uniform load". "All the GTs/all the GEs are operated at the same load" is set when the amount of generated electric power is adjusted by operating at the same load all the electric power generator gas turbines and all the gas engines that are set. "Only the last models at a uniform load" is set when among a plurality of the electric power group devices, a plurality of devices are designated as the last in the operating priorities, and the amount of generated electric power is adjusted by the plurality of devices designated as the last in the operating priorities. Thus when a plurality of the electric power group devices are set, it is possible to conduct reviews by a variety of modes of controlling the electric power generation group devices. Note that it is also possible to perform settings for a period of nighttime (e.g., from 22:00 hrs. to 8:00 hrs.), similarly to the above. It is possible to freely change time slots in daytime and nighttime, and it is also possible to handle summertime.

The operating conditions of the chilled water group device and the hot water group device are also set. For example, a period of daytime (from 8:00 hrs. to 22:00 hrs.) is divided into four arbitrary time slots, and up to an eighth operating priority is set per time slot in accordance with the state of the load of each device. Note that it is also possible to appropriately increase or decrease the number of time slots and operating priorities that are to be set. As well as the operating priority, the outlet temperature of each device is also set. It is also possible to similarly set the lower-temperature chilled water group device.

The amounts received of high-pressure steam, low-pressure steam, chilled water, hot water, and electric power that can be externally obtained for use are set. For each amount received, a plurality of arbitrary time slots are set, and the amount received per time slot is set. For example, suppose it is set such that low-pressure steam of up to 1 t/h is received from a waste incineration facility day and night. If the amount used of low-pressure steam of the heat and power supply facility is smaller than 1 t/h, only the amount of steam required in the heat and power supply facility is received. On the other hand, if the amount used of low-pressure steam of the heat and power supply facility is greater than 1 t/h, low-pressure steam of 1 t/h that is a maximum is received, and low-pressure steam is balanced by the heat and power supply facility to cover the shortfall. Note that the amount of the total combined energy that is produced by the heat and power supply facility and that can be supplied to another facility is also similarly set. The supplied energy and the total combined energy are balanced, taking these setting values into account. All of high-pressure steam, chilled water, hot water, and electric power are also similarly handled. This enables the operating condition setting section 40 to set an operating plan of the heat and power supply facility with reference to the energy load set by the energy load setting section 10.

In the heat and power supply facility M shown in FIG. 1*b*, the gas turbine and the low-pressure boiler are set as the facilities to be used in daytime as the electric power generation group device and the boiler group device, and the electric power generation group device is automatically set in preference to the boiler. Here, the gas turbine is first set in preference. Further, a minimum purchase amount of electric power is set to 0 kW. On the other hand, it is set such that in nighttime, only the low-pressure boiler is used and electric power is all purchased without setting a minimum purchase amount of electric power. Furthermore, the absorption chiller and the electric centrifugal chiller are set as the facilities to be used in daytime as the chilled water group device and the hot water group device, and the absorption chiller is first set in preference. On the other hand, it is set such that only the absorption chiller is used in nighttime. These settings are performed to cover 12 months.

The operating conditions per month, per day, and per pattern that are created as described above can be copied, and therefore can be written over the daily operating conditions of another month, or can be partially changed where necessary. This makes it possible to quickly create the operating conditions.

After the operating conditions are set in all the above steps, a simulation is performed and the simulation result is output. In the output step (S210), the operating result output section 50 outputs the simulation result as calculations on a time-slot basis and/or as calculations on an annual basis. The outputs are provided in the forms of a graph, a spread sheet, and the like.

Figure 9A:
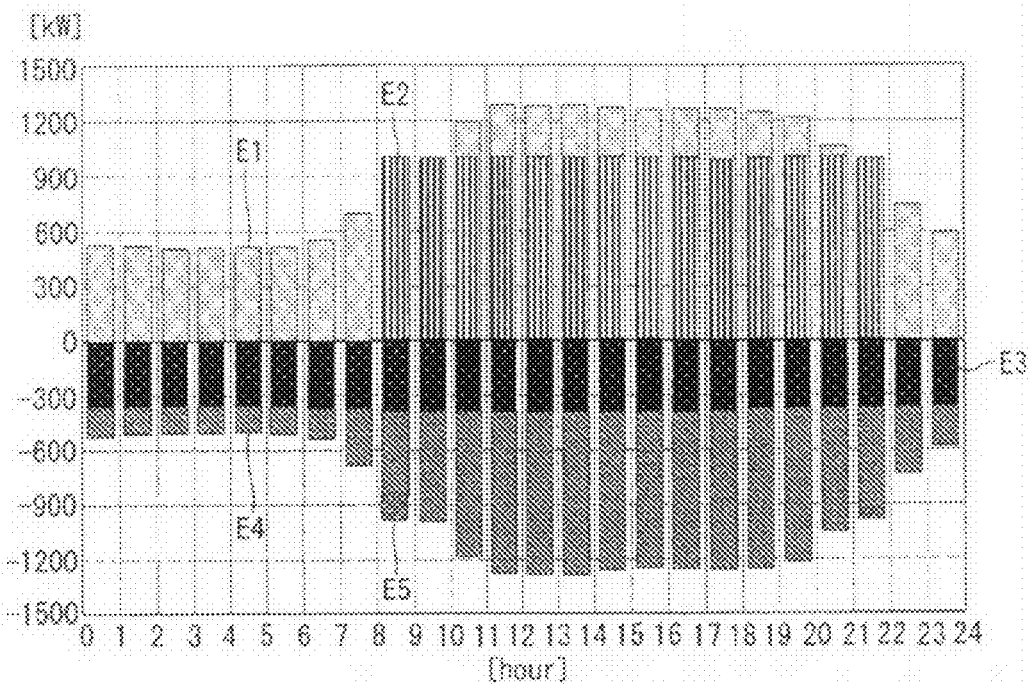
FIG. 9a is a graph showing an example of an electric power balance on a time-slot basis in August when gas turbines are operated at a load of 100%.
Figure 9B:
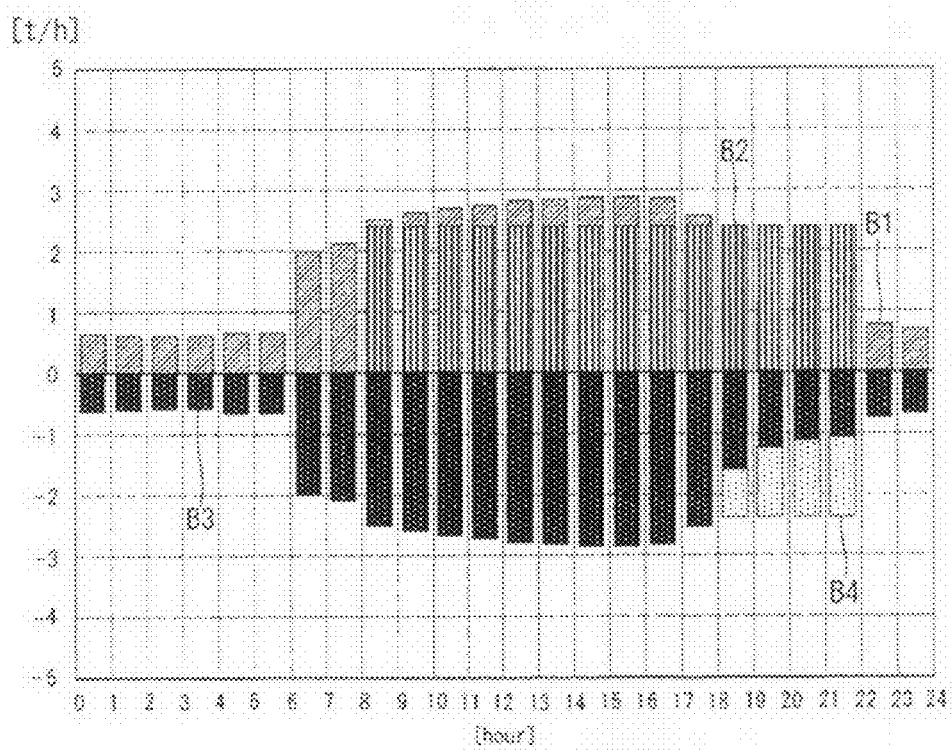
Figure 9C:
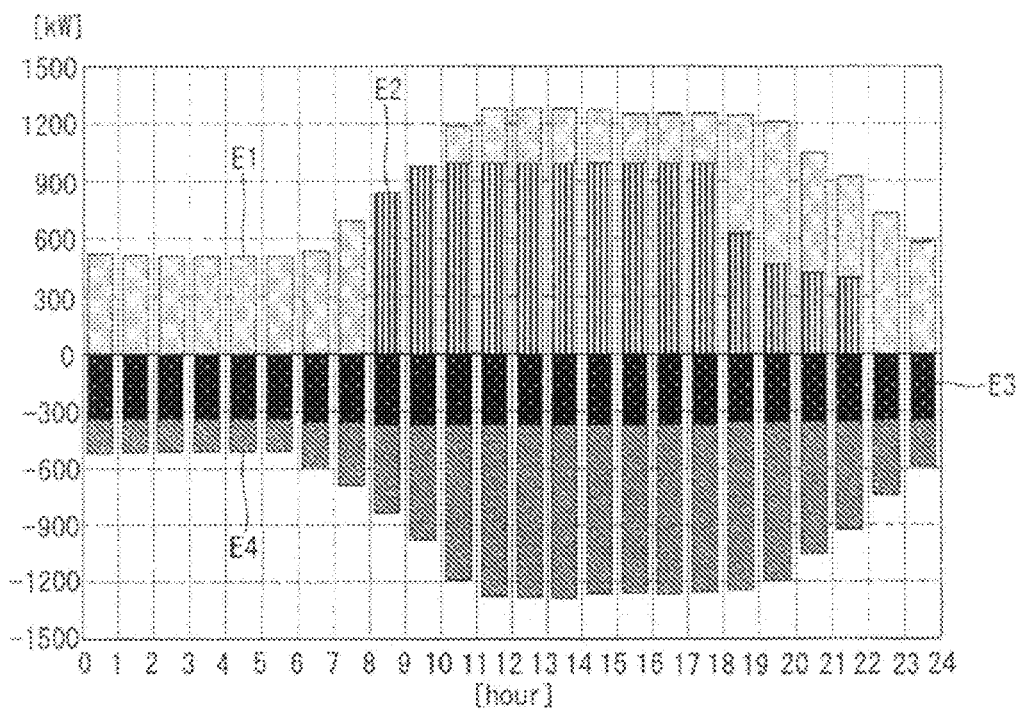
Figure 9D:
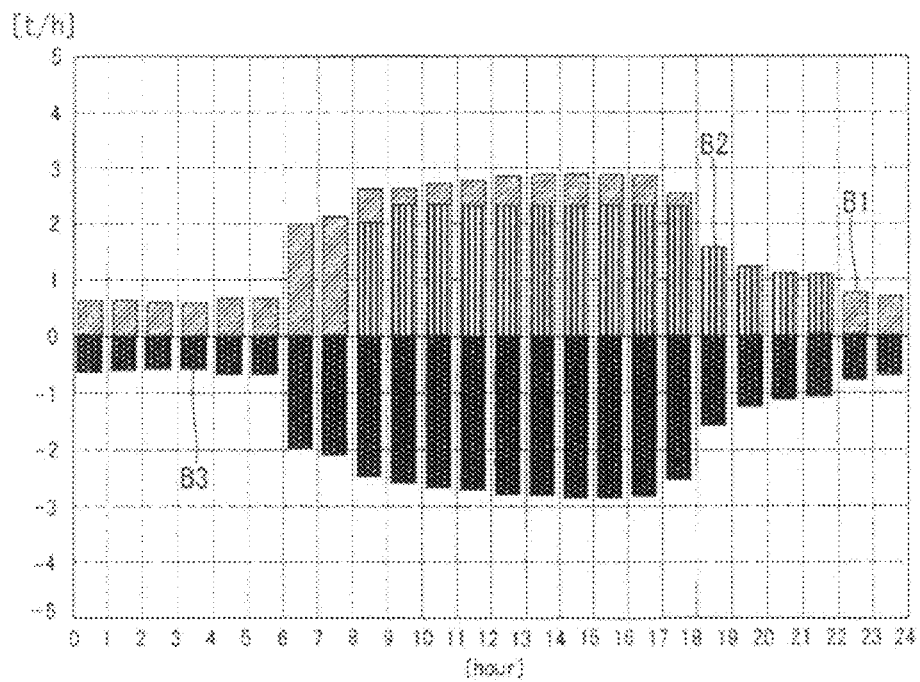
FIG. 9d is a diagram showing a result of convergence calculations where neither back-flow electric power nor surplus steam are to be generated, the diagram corresponding to FIG. 9b.

It is possible to output the results of an electric power balance, a low-pressure steam balance, a fuel consumption, a chilled water balance, the numbers of the devices to be operated, a meter unit price (utility costs), details of electric power consumption, and the consumption of electric power, each as calculations on a time-slot basis and calculations on an annual basis. As an example of the outputs on a time-slot basis, FIGS. 9a and 9c show the results of an electric power balance, and FIGS. 9b and 9d show the results of a steam balance.

In addition, FIGS. 10a through 10c show graphs of an annual electric power balance, an annual low-pressure steam balance, and an annual chilled water balance, respectively. In the example shown in FIG. 10a, the purchase amount of electric power E1, the amount of generated electric power E2 of the GT cogeneration system, the consumption of electric power E3 of the heat and power supply facility, and the consumption of electric power E4 of a facility other than the heat and power supply facility are each displayed on a monthly basis. Further, in the example of FIG. 10b, the amount of generated steam B1 of the low-pressure boiler, the amount of generated steam B2 of the GT cogeneration system, and the consumption of steam B3 of the absorption chiller are displayed. From these graphs, it is understood that neither back-flow electric power E5 nor surplus steam B4 are to be generated throughout the year.

It is also possible to output on a time-slot basis a primary energy/an environmental load/a system COP, and the like, as well as the above. Further, it is also possible to output the following, as calculations on an annual basis: the annual operating period of time of a heat and power supply device (e.g., the electric power generation group device); the summary of a primary energy/an environmental load; a system COP/a $CO_2$ emissions intensity; a maximum value table; an electric power steam cumulative load curve; and the like, as well as the above. Note that outputs are not limited to these examples, and can be provided from various perspectives.

In addition, when an operating time is specified based on the operating conditions that are set and any of the heat and power supply devices that are displayed in the flow diagram, the supplied energy, and the total combined energy are selected, it is possible to display the simulation result at the operating time specified by the display control section 70. For example, as shown in FIG. 7, the operating condition setting section 40 sets time slots hourly in daytime and nighttime, and sets the operating priorities of the heat and power supply devices per time slot. Then a simulation is performed in accordance with the operating conditions hourly set. Thus the specifying of an operating time makes it possible to easily comprehend the simulation result in a specific time slot including the specified time. Note that in the present embodiment, the unit of an operating time is an hour, but is merely illustrative, and can be appropriately set to, for example, 30 minutes or 15 minutes.

Here, with reference to FIGS. 2c, 3, 8a through 8e, and 9, descriptions are given below of the operating condition setting (S208) performed by the operating condition setting section 40 and a simulation calculation procedure followed by the calculation section 7p. These include steps S01 through S07 of FIG. 8a, the steps corresponding to FIGS. 8b through 8e. Note that in the following descriptions, an electric-power-preferential (a preferential operation of electric power load) operation is an operation where electric power does not flow back, and a heat-load-preferential (a preferential operation of heat load) operation is an operation, for example, where steam is not discharged. Further, for the description of each step, only the steps related to an actual case using the heat and power supply facility of FIG. 1b is shown first. In the case of the electric-power-preferential operation, a period of time from 8:00 hrs. to 9:00 hrs. in August is exemplified. In the case of the heat-load-preferential operation, a period of time from 18:00 hrs. to 19:00 hrs. in August is exemplified.

"Chilled Water EB (S01, FIG. 8b)"

First, a chilled water heat load and the temperature difference between supply and return are read (S11), and a required chilled water flow rate is calculated (S12). Then, based on the operating priorities of the chillers, the number of the chillers to be operated is determined so as to satisfy both the chilled water heat load and the chilled water flow rate (S13), and the operating load factor and the COP, of each chiller to be operated are calculated (S14). In these calculations, if the same chilled water outlet temperature is set, a uniform load factor is set. Then the following are calculated: the amount of produced chilled water; the consumptions of electric power, fuel and steam; the exhaust heat from the cooling tower; and the amount of recovered heat of hot water for a heat recovery heat pump; of each chiller to be operated (S15), and the process proceeds to the hot water energy balancing step (S2). Note that the exhaust heat from the cooling tower can be replaced with the exhaust heat to the external use water; as described above.

In this example, in the operating condition setting section 40, it is set in advance such that the absorption chiller has the first operating preference and the electric centrifugal chiller has the second operating preference. The value of a chilled water load, and the supply temperature and the return temperature that are set by the energy load setting section 10 are read therefrom (S11). Then a required chilled water flow rate is calculated by the calculating equation: required flow rate=chilled water load/{(chilled water return temperature−chilled water supply temperature)×4.18605} (S12). The required chilled water flow rate is compared with a maximum supply amount of chilled water, so as to determine the number of the chillers to be operated (S13). The required flow rate satisfies maximum supply amount of chilled water>required flow rate, and therefore it is determined that the number of the absorption chillers is one. Further, it is determined that the COP is 1.287, taking into account the correction of a cooling temperature.

"Low-Pressure Steam EB (S03, FIG. 8c)"

As shown in FIG. 8c, first, low-pressure process steam load data is read (S31a), and the amount of low-pressure process steam is calculated (S31b). The consumption of low-pressure steam is calculated based on the sum of the amount of low-pressure process steam and the amount of low-pressure steam for driving the heat and power supply devices (S31c), so as to determine whether or not low-pressure steam is recovered from the electric power generation group device (S32a). When low-pressure steam is not recovered from the device, the number of the low-pressure boilers to be operated is determined, based on the operating priorities of the low-pressure boilers, so as to satisfy a low-pressure boiler load (S33a), and the operating load factor of each low-pressure boiler to be operated (where only one of the low-pressure boilers is operated at a partial load factor) is calculated (S33b). Thus the amount of produced steam, the consumption of electric power, the consumption of fuel, and the like, of each low-pressure boiler to be operated are calculated (S33c).

On the other hand, when low-pressure steam is recovered from the electric power generation group device, a low-pressure boiler load S2 is obtained by subtracting the amount of received low-pressure steam from the consumption of low-pressure steam, and the amount of generated steam, the consumption of electric power, the fuel, and the like, of the low-pressure boiler are also calculated (S32b). Here, the amount of received low-pressure steam can also include the amount of exhaust steam externally received. Then it is determined whether the electric-power-preferential operation or the heat-load-preferential operation is to be performed (S34).

Figure 8A:
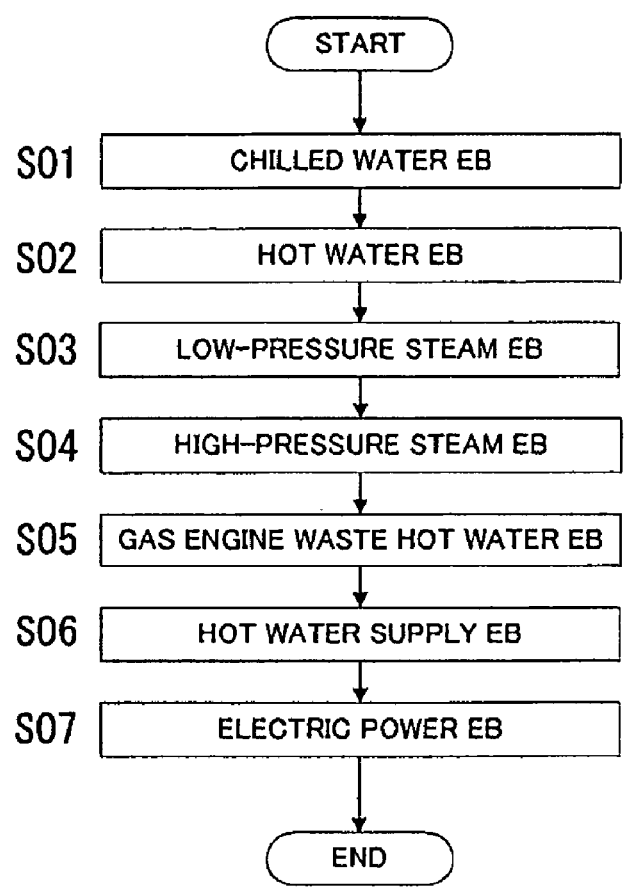
FIG. 8a is a diagram showing an entire general logic flow.
Figure 8B:
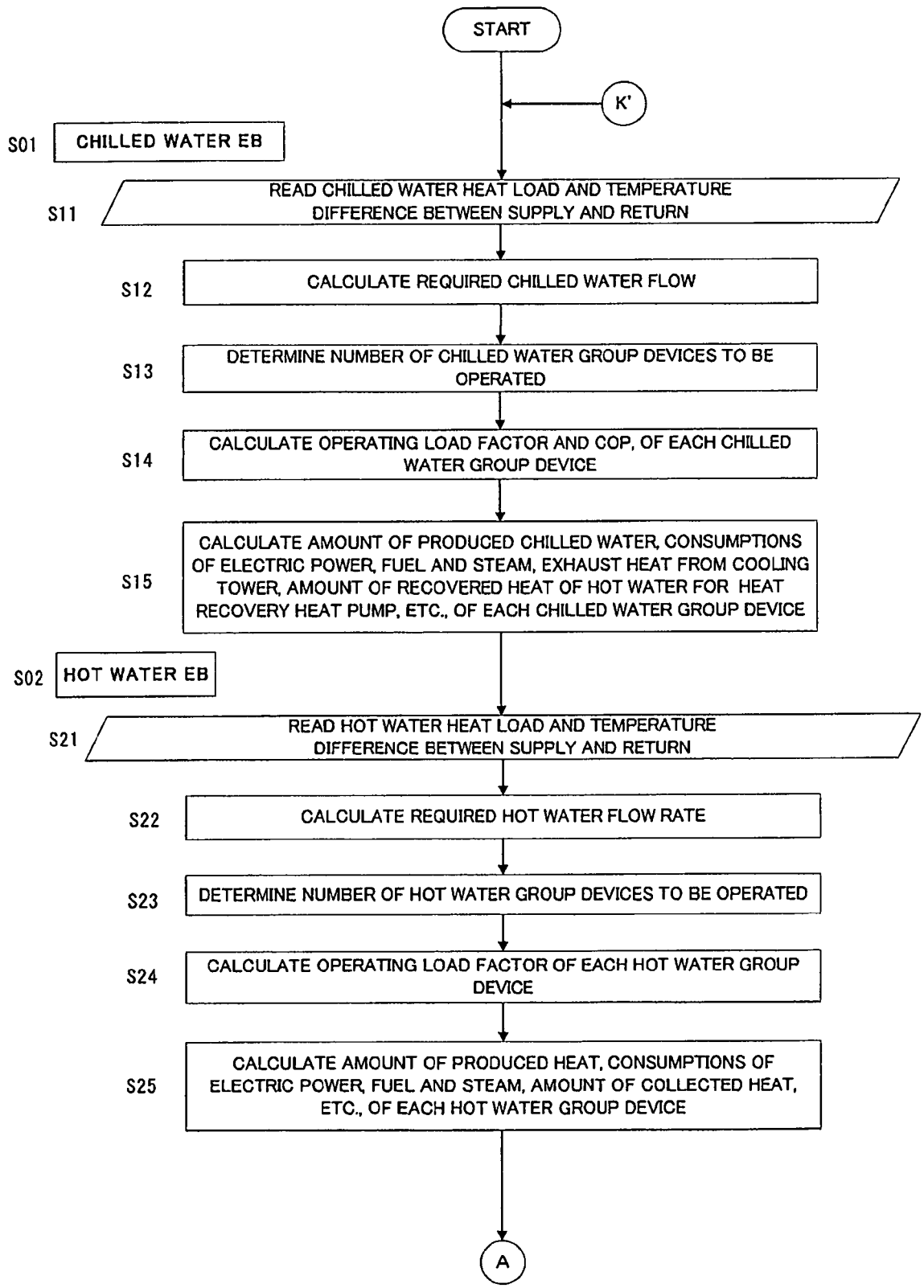
FIG. 8b is a general logic flow diagram of chilled water energy balancing and hot water energy balancing.
Figure 8D:
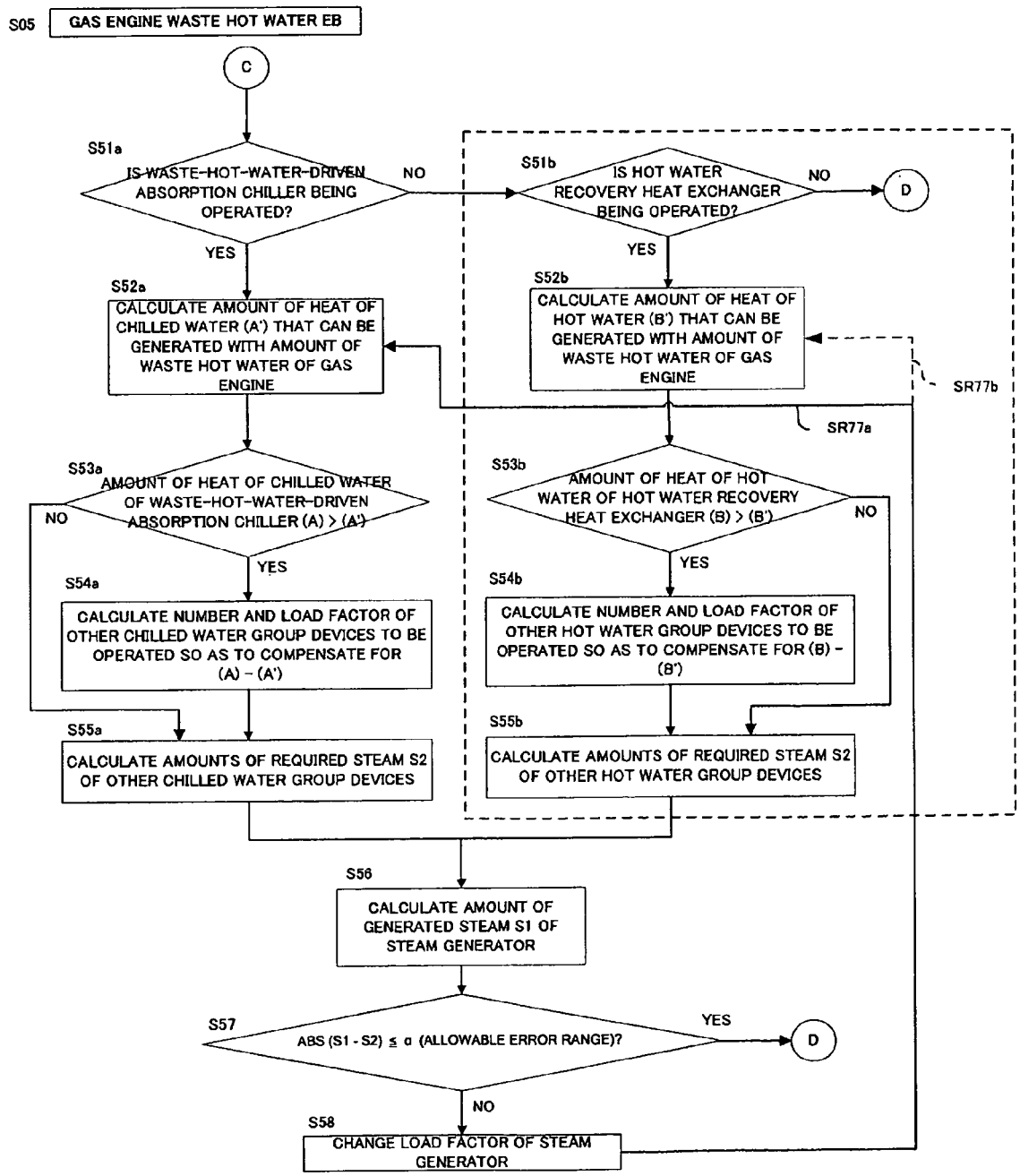
FIG. 8d is a general logic flow diagram of gas engine waste hot water energy balancing.
Figure 8E:
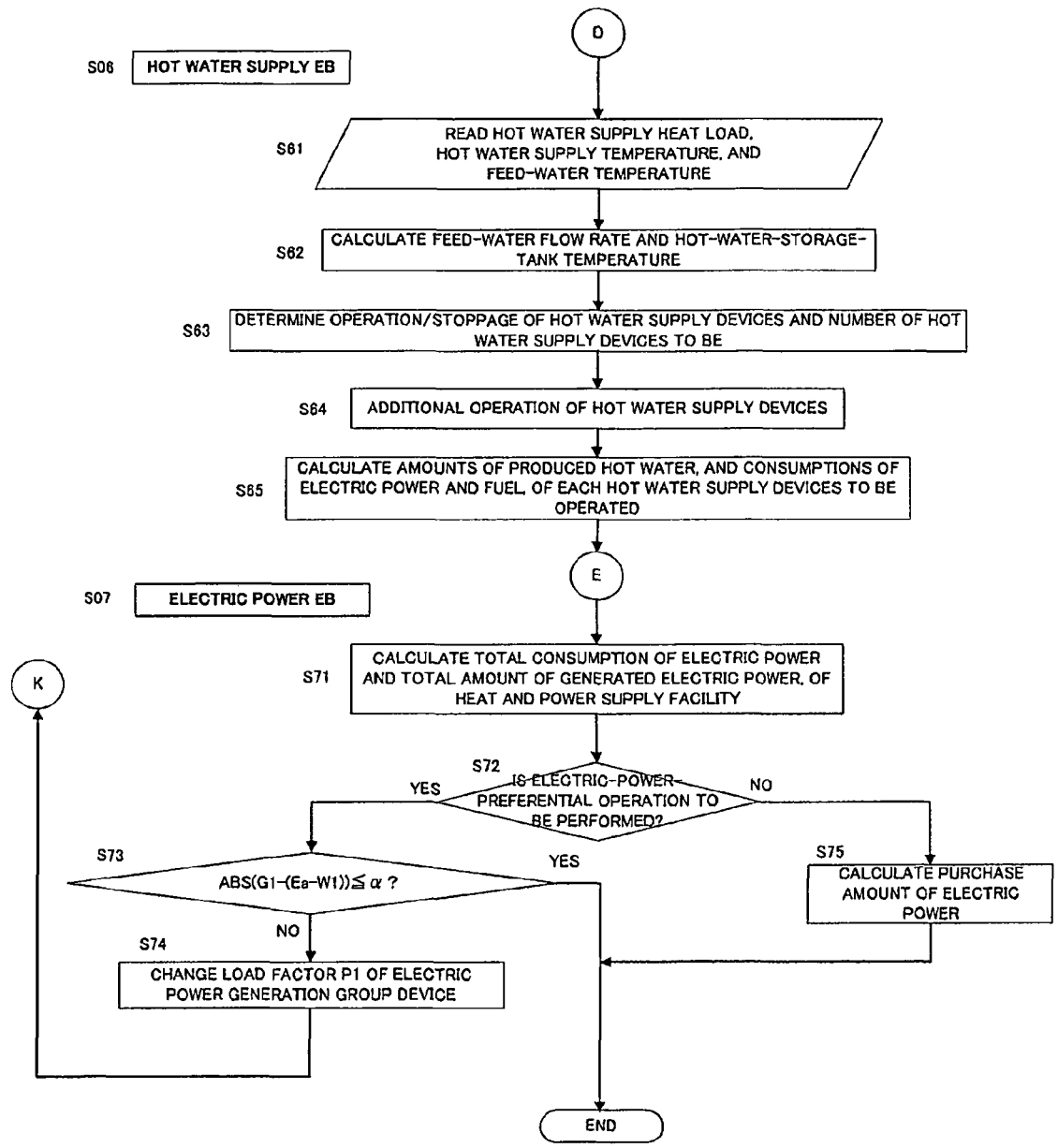
FIG. 8e is a general logic flow diagram of hot water supply energy balancing and electric power energy balancing.

When the electric-power-preferential operation is to be performed, steps S35a through S35f and steps S71 through S73, surrounded by a dashed-dotted line, of the electric power EB are performed. Note that the electric power EB (S07) is shown in FIG. 8d, but is described here for ease of understanding. The devices to be operated and the numbers of the devices to be operated are set based on a target amount of generated electric power (S35a), and the load factor of the electric power generation group devices is set to a maximum load factor (100%) (S35b). Then steps S35c through S35f, S71, and S73 are performed, and if the surplus electric power is within a given error range (e.g., 1 kW) (S73), the process ends and proceeds to the subsequent step. If the surplus electric power is not within the error range (S73), a load factor P1 of the electric power generation group devices is changed as described below, and convergence (convergent) calculations are made so as to repeat steps S35c through S35f and S71 through S74 until the surplus steam falls within the error range.

When the heat-load-preferential operation is to be performed, steps S37a through S38b are performed. Steps S37a through S37c are similar to S35a through S35c, respectively, of the electric-power-preferential operation, and the gas turbine cogeneration system M120 corresponds to both the electric power generation group device and the steam generator. Similarly to the electric-power-preferential operation, steps S37c through S38b are repeated until the surplus steam falls within a given error range α. However, when steam and electricity do not affect each other, these steps are repeated once, and the process proceeds to the subsequent step.

Here, a further detailed description is given of the convergence calculations made in the electric-power-preferential operation using the heat and power supply facility M of FIG. 1b, and related to steps S35a through S74. The number and the load factor of the chillers that are required are obtained based on a chilled water load and a chilled water temperature difference, so as to determine that the number of the absorption chillers M310 is one. Then the amount of required low-pressure steam S2 (t/h) is obtained based on this load factor (S32b).

The difference (Ea−W1) (kW) between the consumption of intrasystem electric power Ea and a minimum purchase amount of electric power W1 is set as a target amount of generated electric power, and the numbers of the gas turbine cogeneration systems M120 and the like to be operated are determined based on the target amount (S35a). The consumption of intrasystem electric power Ea includes the consumptions of internal electric power of the devices M120, M220, M310 and M350, and an electric power load S8. The load factor of the electric power generation group devices such as the gas turbines M120 is set to 100% (S35b). Then the amount of generated electric power G1 (kW/h), the amount of recovered steam S1 (t/h), the consumptions of internal electric power, the consumptions of fuel, and the like, of the set gas turbines are obtained by Relational Equation 1 and the like (S35c).

The amount of recoverable low-pressure steam S1 (t) is obtained based on the calculation result, and it is determined, by comparing S1 with S2, whether or not surplus steam is to be generated (S35d). When surplus steam is to be generated, the surplus steam is to be discarded out of the facility (S35e). When steam is to be insufficient, the low-pressure boilers M220 are operated so as to correspond to S3 (t/h)=S2−S1, and the amount of generated steam, the consumptions of internal electric power, the consumptions of fuel, and the like, of the low-pressure boilers M220 are calculated (S35f). Then, based on the calculation result, the consumption of intrasystem electric power Ea is integrated (S71a).

Here, although not shown in the figures, only in the first loop of S35c through S71, and S73, if G1≦Ea−W1 when it is determined whether or not the electric power to be generated by the GT cogeneration systems is insufficient, the electric power to cover the shortfall is purchased, and the calculations are completed. On the other hand, if G1>Ea−W1, it is determined whether or not ABS (G1−(Ea−W1)) is within an allowable error range α. In the present embodiment, it is set such that allowable error range α=±1 kW, and when ABS (G1−(Ea−W1)) is within the error range, the calculations are completed. Note that "ABS" in the figures represents a function that removes the sign "+" or "−" from the value.

When ABS (G1−(Ea−W1)) is not within the allowable error of ±1 kW, the load factor P1 of the GT cogeneration systems is changed, and the load factor P1 is obtained by Equation 2 so that G1=Ea−W1. However, when the load factor P1 is changed and the amount of recovered steam S1 varies, the consumptions of internal electric power of the GT cogeneration systems and the other devices vary in accordance with the variations in the operating conditions of the GT cogeneration systems and the other devices, and thereby the consumption of intrasystem electric power Ea also varies. Consequently, it becomes impossible to achieve the original object of preventing back-flow by the electric-power-preferential operation. Accordingly, it is necessary to make convergence calculations so as to repeat S35c through S71 after the load factor P1 is changed in S74, as described below, until convergence is achieved in S73.

Here, the relationship between the load factor P of the GT cogeneration systems and an exhaust heat recovery rate S (%) is represented as Equation 1. The relationship between the load factor P and an electric power generation efficiency G (%) is represented as Equation 2. Both Relational Equations are general forms of a multivariate regression equation model and an independent two-variable polynomial. Note that the inlet air temperature is T (° C.).

$$S = f(T, P) \qquad \text{Equation 1}$$

$$G = g(T, P) \qquad \text{Equation 2}$$

When the inlet air temperature is constant, if the load factor (%) is obtained based on a target amount of generated electric power that is created as a quadratic of explanatory variables, the load factor can be obtained as the solution of the quadratic. A gas turbine, however, has a limitation based on a minimum load factor (%), and therefore the intermediate value (Pmid (%)) between a maximum load factor (Pmax (%)) and a minimum load factor (Pmin (%)) is defined as the starting point of calculations. Thus a target load factor (%) is obtained by convergent calculations using binary search where: it is determined that Pmax=Pmid, when the amount of generated electric power at Pmid (%) is greater than the target amount of generated electric power; and it is determined that Pmin=Pmid, when the amount of generated electric power at Pmid (%) is smaller than the target amount of generated electric power. Simultaneously, the difference between the amount of generated electric power (kW) at Pmid (%) and the target amount of generated electric power (kW) tolerates an allowable error of within 1 kW. Note that a maximum number of times the convergent calculations is 20, taking into account the case where it is impossible to converge; however, the number of times of convergence can be appropriately set.

When convergence has been achieved, the process proceeds to the subsequent step (S36a).

The binary search method is merely an example of the convergent calculations made based on a numerical solution of algebraic equations. The convergent calculations made based on a numerical solution of algebraic equations are numerical calculations of equations that, unlike a high-order algebraic equation, a fractional equation, an irrational equation, or a transcendental equation, do not include differential and integral. As well as this, a Newton-Raphson method, a binary search method, a Regula-Falsi method, a Bairstow-Hitchcock method, a Lin's method, a Bernoulli's method, a Graeffe's method, and the like may typically be used. All the convergence calculations in the present invention can be made using these methods.

In contrast to the above, in the heat-load-preferential operation in S37a through S38b, it is reviewed whether or not the difference between the amount of recovered steam S1 and the low-pressure steam load S2 is within the error range α. Normally, one change of the load factor P1 is sufficient for the review, and therefore it is not necessary to make convergence calculations. However, a device such as a GT cogeneration system with variable heat power ratio M110 can recover generated steam again so as to improve the electric power generation efficiency. In this case, it is possible to make convergence calculations by changing the steam recovery rate and/or the load factor P1 so that low-pressure steam is neither excessive nor insufficient, and electric power does not flow back.

Next, an example of calculations is described in further detail. First, in the electric-power-preferential operation, it is set such that the absorption chiller M310 has the first operating preference and the electric centrifugal chiller M350 has the second operating preference. The value of a chilled water load, and the difference between the supply temperature and the return temperature are read from the energy load setting section 10, and a required flow rate, which corresponds to the energy of the load of chilled water, is calculated. The required flow rate is calculated by chilled water load/{(chilled water return temperature−chilled water supply temperature)× 4.18605}. In this example, a maximum supply amount of chilled water of the absorption chiller M301 is greater than the required flow rate, and therefore it is determined that the number of the absorption chillers is one. Then the following are calculated: the amount of produced chilled water, the consumption of electric power, and the consumption of steam, of the absorption chiller M310, which has the first operating preference; and the amount of exhaust heat from the cooling tower. Based on the consumption of steam of the absorption chiller M310, the number and the load factor of the low-pressure boilers M220 are determined, and the consumptions of gas and the consumptions of electric power, of the low-pressure boilers M220 are calculated.

Next, comparison is made between: the amount of generated electric power G1 of the gas turbine electric power generators that is obtained in the first loop; the intrasystem required electric power Ea; and the minimum purchase amount of electric power W1 set by the operating condition setting section 40. As shown in FIG. 9a, the back-flow electric power E5 from 8:00 hrs. to 9:00 hrs. shows back-flow of 162 kW. This corresponds to G1>Ea−W1. Convergence calculations are made so as to sequentially change the load factor to Pmid described above so that the electrical energy from the electric power generators does not flow back as surplus electricity to an electric power company. If G1<Ea−W, the convergence calculations are completed.

Next, also in the heat-load-preferential operation, a maximum supply amount of chilled water of the absorption chiller is greater than the required flow rate, and therefore it is determined that the number of the absorption chillers is one. The load factor P1 of the gas turbines is obtained so that when the gas turbines are operated at a load of 100%, ABS (S1−S2)≦α is obtained, where surplus steam B4 of 0.8 t/h is generated from 18:00 hrs. to 19:00 hrs., as shown in FIG. 9b.

Table 3a shows the calculation result of the amount of generated electric power, the load factor, and the like, of the GT cogeneration systems that are obtained in the first loop. Table 3b shows the equations used for the calculations. Further, Table 4 shows the result of making convergence calculations so as to balance electric power generation and steam. In Table 3b, Equation 3-3 corresponds to the above Equation 1, and Equation 3-4 corresponds to the above Equation 2.

TABLE 3a

| ITEM | SIGN | UNIT | ELECTRIC-POWER-LOAD PREFERENTIAL OPERATION 8:00-9:00 HRS., AUG. | HEAT-LOAD PREFERENTIAL OPERATION 18:00-19:00 HRS., AUG. |
|---|---|---|---|---|
| AMOUNT OF GENERATED ELECTRIC POWER | G1 | kW | 1,000.00 | |
| RATED ELECTIC POWER GENERATION OUTPUT | $G^R$ | kW | 1,000.0 | |
| LOAD FACTOR | x | % | 100.00 | |
| INLET AIR TEMPERATURE | T | °C. | 29.1 | |
| ELECTRIC POWER GENERATION EFFICIENCY | $\eta_G$ | % | 29.37 | |
| HEAT RECOVERY RATE | $\eta_S$ | % | 49.24 | |
| AMOUNT OT RECOVERED STEAM | $F_{SG}$ | t/h | 2.40 | |

TABLE 3b 3-1
$$x = \frac{G}{G^{(R)}} \times 100$$

x: LOAD FACTOR [%]
$G^{(R)}$: RATED ELECTRIC POWER GENERATION OUTPUT [kW] @INLET AIR TEMPERATURE 0° C.
G: ELECTRIC POWER GENERATION OUTPUT [kW]

3-2
$T = T_o + \alpha$
T: INLET AIR TEMPERATURE[° C.]
$T_o$: OUTDOOR AIR TEMPERATURE[° C.]
α: PLUS TEMPERATURE[° C.]

3-3
$\eta_G(x, T) = a_0 + a_1 x + a_2 x^2 + a_3 T + a_4 T^2 + a_5 xT + a_6 x^2 T + a_7 xT^2 + a_8 x^2 T^2$ 3-4
$\eta_S(x, T) = b_0 + b_1 x + b_2 x^2 + b_3 T + b_4 T^2 + b_5 xT + b_6 x^2 T + b_7 xT^2 + b_8 x^2 T^2$
$\eta_G(x, T)$: ELECTRIC POWER GENERATION EFFICIENCY [%]
$\eta_S(x, T)$: HEAT RECOVERY RATE [%]
x: LOAD FACTOR [%]
T: INLET AIR TEMPERATURE[%]
Note that coefficients $a_0$ through $a_8$ and $b_0$ through $b_8$ are multiple regression coefficients obtained based on data (a total of 12 groups)

TABLE 3b-continued of 4 groups of load factor-electric power generation efficiency and
load factor-heat recovery rate, in 3 cases of the inlet air temperature.

$$F_{SG} = \frac{F_{FG} \times \lambda_F / 1000 \times \eta_S(x, T) / 100 - F_{BL}(I_{BL} - I_{FW})}{(I_S - I_{FW})} \quad 3\text{-}5$$

$F_{SG}$: AMOUNT OF GENERATED LOW-PRESSURE STEAM [t/h]
$F_{FG}$: CONSUMPTION OF FUEL[Nm³/h] GAS
[kl/h] HEAVY OIL, KEROSENE, OTHER OIL
$\lambda_F$: FUEL LOWER HEATING VALUE [kJ/Nm³] GAS
[kJ/kl] HEAVY OIL, KEROSENE, OTHER OIL
$I_S$: LOW-PRESSURE STEAM ENTHALPY [kJ/kg]
$I_{FW}$: FEED WATER ENTHALPY [kj/kg]
$\eta_S(x, T)$: HEAT RECOVERY RATE [%]
$F_{BL}$: AMOUNT OF BLOWDOWN WATER [t/h]
$I_{BL}$: BLOWDOWN WATER ENTHALPY [kJ/kg]

TABLE 4

| ITEM | SIGN | UNIT | ELECTRIC-POWER-PREFERENTIAL OPERATION 8:00-9:00 HRS., AUG. | HEAT-LOAD-PREFERENTIAL OPERATION 18:00-19:00 HRS., AUG. |
|---|---|---|---|---|
| AMOUNTS OF GENERATED ELECTRIC POWER, STEAM, ETC. OF GT COGENERATION SYSTEM | | | | |
| AMOUNT OF GENERATED ELECTRIC POWER | G | kW | 837.14 | 630.90 |
| LOAD FACTOR | x | % | 83.71 | 63.09 |
| INLET AIR TEMPERATURE | T | ° C. | 29.1 | 30.1 |
| ELECTRIC POWER GENERATION EFFICIENCY | $n_G$ | % | 27.84 | 25.67 |
| HEAT RECOVERY RATE | $n_S$ | % | 47.54 | 45.22 |
| AMOUNT OF RECOVERED STEAM | $F_{SG}$ | t/h | 2.05 | 1.59 |

The above descriptions are given taking as an example the heat and power supply facility shown in FIG. 1b. Other balancing calculation steps shown in FIG. 8a are performed depending on the configuration of the heat and power supply facility. Descriptions are given below of steps other than the above steps.

"Hot Water EB (S02)"

As shown in FIG. 8a, a hot water heat load and the temperature difference between supply and return are read (S21), and a required hot water flow rate is calculated (S22). Then, based on the operating priorities of the hot water group devices, the number of the hot water group devices to be operated is determined so as to satisfy both the hot water heat load and the hot water flow rate (S23), and the operating load factor of each hot water group device to be operated is calculated (S24). In these calculations, if the same hot water outlet temperature is set, a uniform load factor is set, but the load factor of the heat recovery heat pump may be different from those of other devices. Then the amount of produced hot water, the consumptions of electric power, fuel and steam, the amount of collected heat, and the like, of each hot water group device to be operated are calculated (S25), and the process proceeds to the low-pressure steam EB (S03) described above. Note that the amount of collected heat can also include the amount of heat collected from external use water (seawater, river water, or the like).

"High-Pressure Steam EB (S03)"

This is substantially the same as the low-pressure steam EB in S03 except that "low-pressure steam" in the low-pressure steam EB is replaced with "high-pressure steam", and therefore is not shown. These EBs, however, are different in that the amount of steam, obtained by the header reducing the pressure of high-pressure steam, so as to be received as low-pressure steam is not the surplus steam to be generated in step S35e described above. After sign B shown in the low-pressure steam EB (S03), the high-pressure steam EB (S04), not shown in detail in the figures, is performed, and the gas engine waste hot water EB (S05) is performed, starting from sign C.

"Gas Engine Waste Hot Water EB (S05, FIG. 8d)"

First, in the chilled water EB (S01) previously performed, the number and the load factors of the chilled water group devices to be operated are calculated, and the amount of heat of chilled water (an amount produced Ma) A of a waste-hot-water-driven absorption chiller and the amounts of heat of chilled water of other chilled water group devices are determined (S13 through S15). In addition, in the hot water EB (S02) previously performed, the number and the load factors of the hot water group devices to be operated are calculated, and the amount of heat of hot water B of a hot water recovery heat exchanger is determined (S23 through S25).

Next, it is determined whether or not the waste-hot-water-driven absorption chiller is being operated (S51a). When the waste-hot-water-driven absorption chiller is being operated, the amount of waste hot water of a gas engine is calculated, and thereby the amount of heat of chilled water A', of the waste-hot-water-driven absorption chiller, that can be generated by the calculated amount of waste hot water is calculated (S52a). Then it is determined whether or not the amount of heat of chilled water to be generated A' is insufficient as compared to the amount of heat of chilled water A determined above (S53a), and when the amount is not insufficient, the process proceeds to S55a. On the other hand, when the amount is insufficient, the number and the load factor of the other chilled water group devices to be operated are determined based on the operating priorities of the chilled water group devices so that the other chilled water group devices produce an amount of heat of chilled water that covers the shortfall (S54a), and the process proceeds to S55a. The amount of required steam S2 of the other chilled water group devices and the amount of generated steam S1 of the steam generator are obtained (S55a, S56), and it is determined whether or not the difference between the amount of generated steam S1 and the amount of required steam S2 is within a predetermined error range α (S57). Note that the unit and the value of the error range α vary depending on the energy.

When the difference is not within the error range α, the load factor of the steam generator is changed (S58), and the process returns to step S52a via a path represented as sign SR57a. Steps S52a through S58 are repeated until the amount of heat of chilled water becomes sufficient and the difference falls within the error range α. That is, convergence calculations are made by changing the load factor of the steam generator so that the amount of generated steam S1 converges on the amount of required steam S2, so as to determine the number and/or the load factor of the chilled water group devices to be operated that can balance chilled water and steam. When the difference has fallen within the error range α, the process proceeds to the hot water supply EB (S06).

On the other hand, when the waste-hot-water-driven absorption chiller is not being operated, it is determined whether or not the hot water recovery heat exchanger is being operated (S51b). When the hot water recovery heat exchanger is being operated, the procedure is followed in the order of steps S52b through S58, surrounded by a dashed line shown in FIG. 8d, and via path SR57b. This procedure is similar to that of the chilled water group devices as described above. Convergence calculations are made by changing the load factor of the steam generator, so as to determine the number and/or the load factor of the hot water group devices to be operated that can balance hot water and steam. When the hot water recovery heat exchanger is not being operated, the process proceeds to the hot water supply EB (S06).

Figures 11, 12:
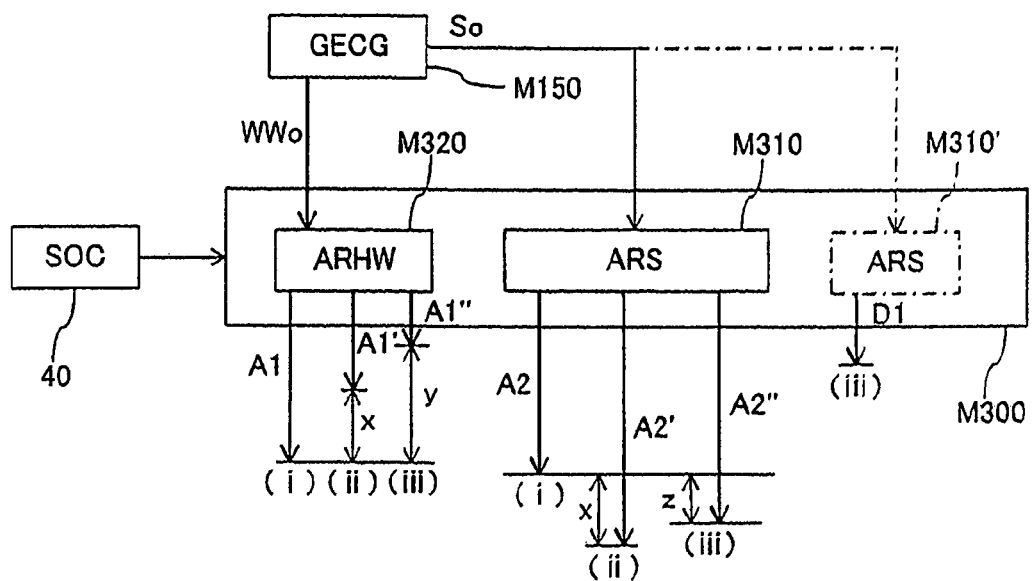
FIG. 11 is a block diagram showing the relationships between a gas engine, a waste-hot-water-driven absorption chiller, and other chilled water group devices.
FIG. 12 is a diagram showing the relationships between the amounts of produced chilled water and the load factors, of all the chilled water group devices shown in FIG. 11.

Here, a description is given taking FIGS. 11 and 12 as an example. A heat and power supply facility exemplified in FIG. 11 includes a gas engine M150, a waste-hot-water-driven absorption chiller M320 as the waste-hot-water-driven absorption chiller, and the absorption chiller M310 as one of the other chilled water group devices. As shown in FIG. 12, in steps S13 through S15 previously performed, the numbers and load factors Lp of the devices to be operated are calculated with respect to a chilled water load C, and it is determined that the amount of heat of chilled water (the amount produced Ma) A is A1.

When the amount of heat of chilled water to be generated A' is A1', in S74a the load factor of the absorption chiller M310 is changed to a2' so as to produce an amount of heat of chilled water A2' that compensates for a shortfall amount of heat x. When the amount of heat of chilled water to be generated is A1", the absorption chiller M310 cannot compensate for a shortfall amount of heat y, and therefore, for example, an absorption chiller M310' is newly started up, and the load factors of the absorption chillers are changed to a2" and d1, respectively, so that the two absorption chillers compensate for the shortfall amount of heat y. Thus, when the number and/or the load factor of the chilled water group devices to be operated are changed, the amount of required steam S2 varies, and the load factor of the gas engine M150, which supplies steam So (Si), also varies. Consequently, the amount of waste hot water WWo varies, and the amount of heat of chilled water of the waste-hot-water-driven absorption chiller M320 also varies. Accordingly, the load factor of the gas engine M150 is determined so that the difference between the amount of generated steam 51 and the amount of required steam S2 is within the predetermined error range α (S55a through S58). Here, a minimum operating load factor is defined in advance for the gas engine M150, and therefore the gas engine M150 is not operated at the minimum operating load factor or less. In this case, for example, steam is supplied by another steam generator such as the low-pressure boiler, and the load factor of the steam generator is changed so that the amount of generated steam S1 of the steam generator converges on the amount of required steam S2 (S58). Note that as the waste-hot-water-driven absorption chiller, Genelink (registered trademark) may be used. Further, it is possible to simultaneously use the waste-hot-water-driven absorption chiller and the hot water recovery heat exchanger.

"Hot Water Supply EB (S06, FIG. 8e)"

First, a hot water supply heat load, a hot water supply temperature, and a feed-water temperature are read (S61), and a feed-water flow rate and a hot-water-storage-tank temperature are calculated (S62). Then, based on the hot-water-storage-tank temperature, the operation/stoppage of hot water supply devices and the number of the hot water supply devices to be operated/stopped are determined (S63), and additional operations of hot water supply devices are performed so that thermal storage of the hot water storage tank is completed at a specified time (S64). Then the amount of produced hot water, and the consumptions of electric power and fuel, of each hot water supply device to be operated are calculated (S65), and the process proceeds to the subsequent electric power EB (S07).

"Electric Power EB (S07)"

Here, after S71 described above, it is determined whether or not the electric-power-preferential operation is to be performed (S72), and a general procedure is as described above in the low-pressure steam EB. When the heat-load-preferential operation is to be performed (S72), the purchase amount of electric power is calculated (S75), and the process ends. When the load factor P1 has been reset in the electric-power-preferential operation, it is set such that the process returns (K) to be prior to S35c of the low-pressure steam EB03, for ease of description; however, it may be set such that the process returns to, for example, the starting position (K') in the chilled water EB01, so long as calculations do not give contradictory results. There is a point in resetting conditions and readjusting the operating states of the devices of all the groups so that a specific total combined energy converges on a target value.

FIGS. 9a and 9b show a graph to be obtained when the GT cogeneration system is operated at a load of 100% in the heat and power supply facility of FIG. 1b. As described above, the process condition setting section 22 has set the breakdown of the electric power load as "a load to be supplied to a facility other than the heat and power supply facility", and therefore the value of the electric power load set by the energy load setting section 10 is input to the field of electric power other than those of heat sources, and the electric power required by the heat and power supply facility is input to the field of heat and power supply electric power as a simulation result. In FIG. 9a, in the time slot from 8:00 hrs. to 10:00 hrs., and also from 21:00 hrs. to 22:00 hrs., back-flow electric power E5 is generated. Further, FIG. 9b shows a result of simulating a steam balance to be obtained when electric power is allowed to flow back in the electric-power-preferential operation. As described above, the process condition setting section 22 has set the breakdown of the low-pressure steam load as "supplied to only a facility other than the heat and power supply facility", and therefore, as the value of the low-pressure steam load set by the energy load setting section 10, 0 is input to the field of low-pressure steam load, and the amount used of steam required by the heat and power supply facility M is input to the field of total low-pressure steam as the simulation result. In FIG. 9b, in the time slot from 18:00 hrs. to 22:00 hrs., surplus steam is generated.

Accordingly, the operating condition setting section 40 sets a period of time from 8:00 hrs. to 18:00 hrs. as the electric power load preference, and sets a period of time from 18:00 hrs. to 22:00 hrs., during which surplus steam is generated, as the heat and power load preference. Then convergence calculations as described above are made, and as shown in FIGS. 9c and 9d, back-flow electric power and surplus steam are eliminated and become 0 in all the time slots.

Each device has a device model in which related devices are incorporated, so as to be operated and calculated in accordance with the operating conditions (load factors) of the related devices, or, if there are constraint conditions, operated and calculated in the range of the constraint conditions. For example, as the related devices of the absorption chiller, the following are incorporated: the power of an auxiliary device of the absorption chiller; the chilled water pump; the cooling water pump; and a dedicated cooling tower. As the constraint conditions, the following are calculated: the start-up loss; and the amount of steam, the electrical energy, the amount used of water, and the amount of chilled water to be output, of the absorption chiller to be operated taking into account, for example, the lower limit of the cooling water temperature where the absorption chiller can be operated. When the chilled water flow rate set by the load setting section is insufficient with one absorption chiller, another chiller (e.g., the electric centrifugal chiller) is started up in the order of the chillers set by the operating condition setting section 40, so as to balance the amount of chilled water. If the chilled water balance is still not achieved, it is configured so that the device having the last operating priority is additionally and automatically started up to achieve the balance.

The steam to be supplied to the absorption chiller is configured to be supplied as steam generated by the boiler group and the electric power generation group, based on a required steam balance. In both the boiler group and the electric power generation group, each device is modeled as in the chilled water group, and is started up in the order set by the operating condition setting section 40, so as to balance the amount of steam and the amount of generated electric power. If steam and electricity are still not balanced, it is configured so that the heat source device having the last operating priority is additionally started up to achieve the balances.

Thus the procedures of system balance calculations are followed so as to construct a heat and power supply input/output balance for each group, for example, in the order of chilled water, hot water, low-pressure steam, high-pressure steam, hot water for supply, and electric power. When the constructed conditions are changed, convergence calculations are made using a multivariate algebraic equation numerical analysis method, so as to calculate the heat and power supply balances of all the groups. An output is provided with respect to each device when the device is operated at the load of the device based on the result of the balancing, and is organized into required information and provided by the operating result output section 50 as described above. The output is provided in the form of a graph that is output on a time-slot basis and output as calculations on an annual basis, and in the form of a spread sheet.

Figure 13:
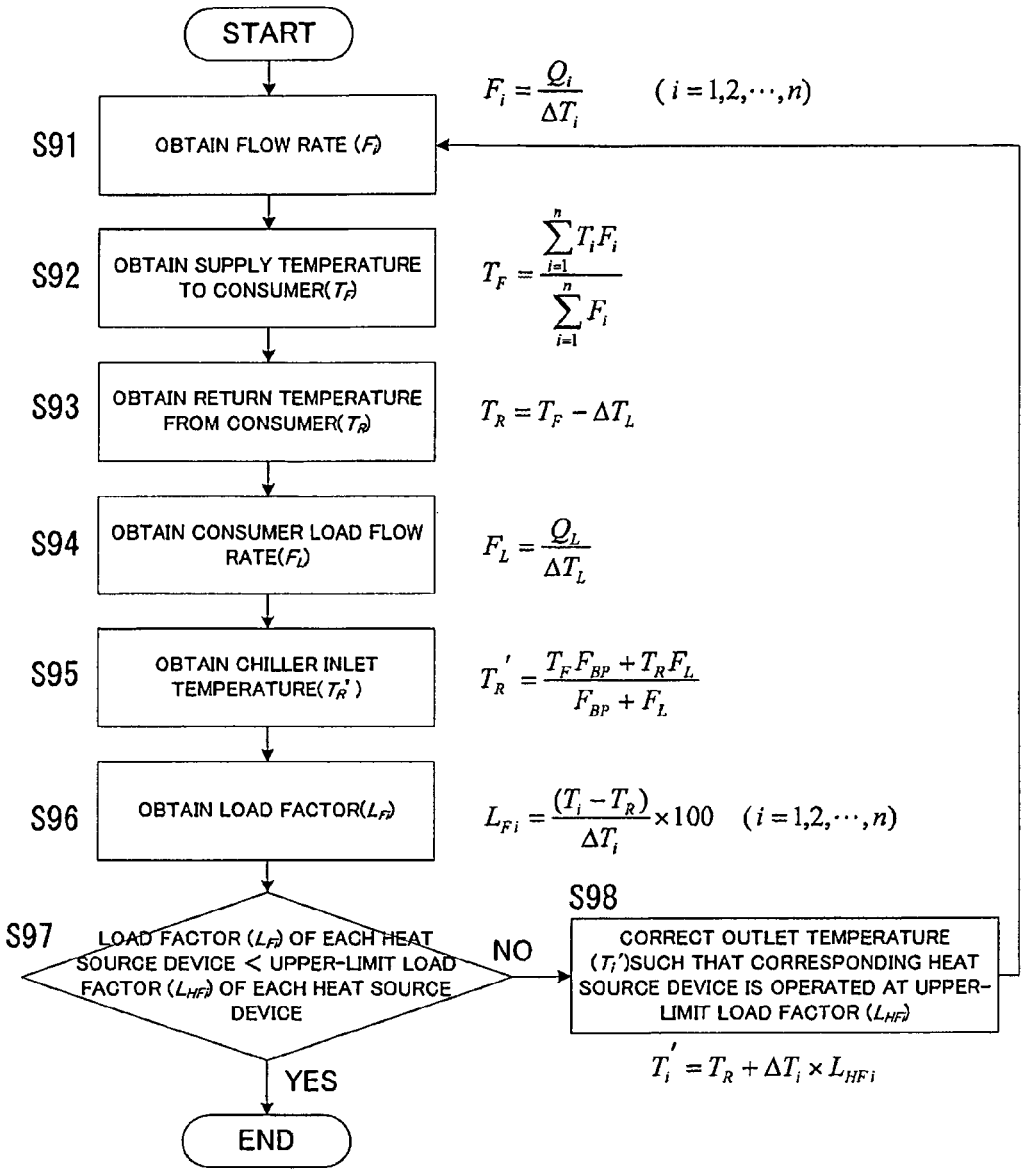
FIG. 13 is a flow diagram of calculations of the load factor of chilled water group devices.

In the chilled water EB (S01) and the hot water EB (S02), the cases of the same outlet temperatures are handled in S14 and S24, respectively. However, when the set outlet temperature goes beyond a device performance, for example, based on changes over time, or when an outlet temperature is set low, for example, using a device having a high COP, the outlet temperature may not be able to be set to the set temperature, and therefore these energy balancing processes may not be completed. Accordingly, with a device configuration shown in FIG. 14, a process of FIG. 13 is additionally performed in the chilled water EB (S01) and the hot water EB (S02), and thereby the load factors of the devices that are so energy-balanced as to match an actual situation are set.

Figure 14:
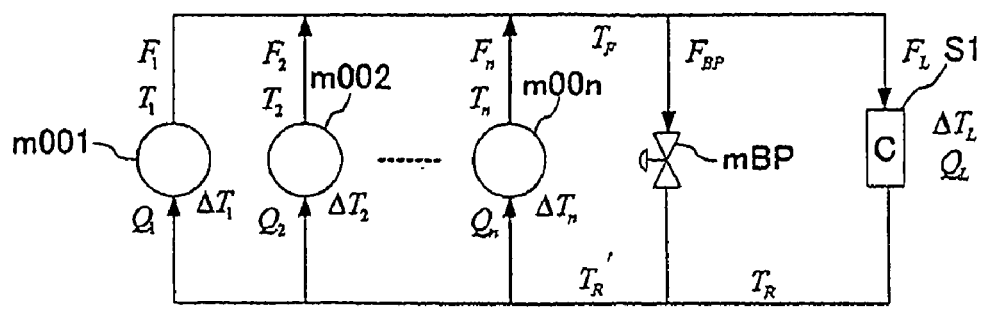
FIG. 14 is a block diagram showing chilled water group devices.

A heat and power supply facility of FIG. 14 includes a plurality of devices m001 and m002 through m00$n$ of the chilled water group and the hot water group, such as the absorption chiller M310 described above and a hot water exchanger M410. These devices are connected in parallel to each other. Outlet chilled water or outlet hot water merges to be supplied to a chilled water load S1 which is a "consumer", or to a bypass flow path mBP, and is recovered. Table 7 shows below the process of calculations made based on equations of Table 6 and the flow of FIG. 13, using three absorption chillers having respective performances shown in Table 5. Note that in each chiller: the design capacity is Qi (kW); the actual capacity is QAi (kW); the design temperature difference is $\Delta$Ti (° C.); and the flow rate is Fi (m³/h). Further, a chiller outlet temperature is Ti (° C.); a supply temperature to consumer is TF (° C.); the amount of heat of consumer load is QL (MJ/h); a consumer temperature difference is $\Delta$TL (° C.); a return temperature from consumer is TR (° C.); a consumer load flow rate is FL (m³/h); a bypass flow rate is FBP (m³/h); a chiller inlet temperature is TR' (° C.); a chiller load factor is LFi (%); an upper-limit load factor is LHFi (%); and a corrected outlet temperature is Ti' (° C.).

TABLE 5

|  |  | mOO1 | mOO2 | mOO3 |
|---|---|---|---|---|
| $Q_i$ | kW | 100 | 150 | 200 |
| $Q_{Ai}$ | kW | 100 | 150 | 200 |
| $\Delta T_i$ | ° C. | 5.00 | 5.00 | 5.00 |
| $F_i$ | m³/h | 17 | 26 | 34 |

TABLE 6

$$F_i[m^3/h] = \frac{3.6}{4.18605} \frac{Q_i[kW]}{\Delta T_i[° C.]} \qquad (6\text{-}1)$$

$$T_F[° C.] = \frac{\sum_{i=1}^{n} T_i[° C.]F_i[m^3/h]}{\sum_{i=1}^{n} F_i[m^3/h]} \qquad (6\text{-}2)$$

$$T_R[° C.] = T_F[° C.] + \Delta T_L[° C.] \qquad (6\text{-}3)$$

$$F_L[m^3/h] = \frac{1}{4.18605} \frac{Q_L[MJ/h]}{\Delta T_L[° C.]} \qquad (6\text{-}4)$$

$$F_{BP}[m^3/h] = \sum_{i=1}^{n} F_i[m^3/h] - F_L[m^3/h] \qquad (6\text{-}5)$$

$$T_R'[° C.] = \frac{T_F[° C.]F_{BP}[m^3/h] + T_R[° C.]F_L[m^3/h]}{F_{BP}[m^3/h] + F_L[m^3/h]} \qquad (6\text{-}6)$$

$$L_{Fi}[\%] = \frac{(T_R[° C.] - T_i[° C.])}{\Delta T_i[° C.]} \times 100 \qquad (6\text{-}7)$$

$$T_i'[° C.] = T_R[° C.] - \Delta T_i[° C.] \times L_{HFi}[\%]/100 \qquad (6\text{-}8)$$

First, the flow rate (Fi) is obtained based on the design capacity (Qi) and the design temperature difference ($\Delta$Ti), of each chilled water group device (S91, Equation 6-1). The supply temperature to consumer (TF) is obtained based on the flow rate (Fi) and the outlet temperature (Ti), of each chilled water group device (S92, Equation 6-2). The return temperature from consumer (TR) is obtained based on the supply temperature to consumer (TF) and the temperature difference in load ($\Delta$TL) (S93, Equation 6-3). The consumer load flow rate (FL) is obtained based on the amount of heat of consumer load (QL) and the temperature difference ($\Delta$TL) (S94, Equation 6-4). The chiller inlet temperature (TR') is obtained based on the return temperature from consumer (TR), the flow rate, the bypass flow rate (FBP), and the bypass chilled water temperature (TF) (S95, Equations 6-5 and 6-6). The load factor (LFi) is obtained based on the temperature difference (TR−Ti) and the design temperature difference (ΔTi), of each chilled water group device (S96, Equation 6-7). It is determined whether or not load factor (LFi) of each chiller<upper-limit load factor (LHFi) of each chiller (S97). When a device is present whose load factor is greater than the upper-limit load factor, the outlet temperature (Ti) is corrected so that the corresponding chilled water group device is operated at the upper-limit load factor (LHFi) (S98, Equation 6-8). Then the flow of S91 through S97 is repeated, and the above routine is completed if load factor (LFi) of each chiller≦upper-limit load factor (LHFi) of each chiller, in each chilled water group device.

In the example of Table 7: the leftmost columns represent the number of times of the repetition of settings; "St" represents setting; and "Cr" represents correction. Based on these segmentations, the chiller outlet temperature Ti (° C.) and the supply temperature to consumer TF (° C.) are written in rows corresponding to m001 through m003. To the right of m003, values common to the devices are displayed at each repetition. In the first settings (the leftmost column 0), the load factor of the device m003 is 104.8%, which exceeds 100%, and therefore an outlet temperature of 5.54° C. is set again so that the load factor is 100%, and the first repetitive calculations are made. The calculation result is 102.1%, and therefore an outlet temperature of 5.65° C. is set again so that the load factor is 100%. This procedure is repeated thereafter, and the load factor reaches 100% at the fifth time. Note that the outlet temperature may be set again so that the load factor is an arbitrary value less than 100%; however, it is convenient for handling that the outlet temperature is set again so that the load factor is 100% or less. The reason is that the routine of FIG. 13 is incorporated in the routine of FIGS. 8a and 8b, so as to make repetitive calculations.

TABLE 7

|   |    |      |      | m001  | m002  | m003  | TF °C. 6-2 | QL MJ/h | ΔTL °C. | TR °C. 6-3 | FL m3/h 6-4 | FBP m3/h 6-5 | TR' °C. 6-6 |
|---|----|------|------|-------|-------|-------|------|------|------|-------|-------|------|-------|
| 0 | St | Ti   | °C.  | 7.00  | 6.00  | 5.30  | 5.91 | 1.500| 5.00 | 10.91 | 71.67 | 5.7  | 10.5  |
|   |    | LFi  | %    | 70.81 | 90.81 | 104.8 ↓ |      |      |      |       |       |      |       |
|   | Cr | LHFi | %    |       |       | 100.0 |      |      |      |       |       |      |       |
|   |    | Ti'  | °C.  |       |       | 5.54  |      |      |      |       |       |      |       |
| 1 | St | Ti   | °C.  | 7.00  | 6.00  | 5.54  | 6.02 | 1.500| 5.00 | 11.02 | 71.67 | 5.73 | 10.65 |
|   |    | LFi  | %    | 72.95 | 92.95 | 102.1 ↓ |      |      |      |       |       |      |       |
|   | Cr | LHFi | %    |       |       | 100.0 |      |      |      |       |       |      |       |
|   |    | Ti'  | °C.  |       |       | 5.65  |      |      |      |       |       |      |       |
| 2 | St | Ti   | °C.  | 7.00  | 6.00  | 5.65  | 6.07 | 1.500| 5.00 | 11.07 | 71.67 | 5.73 | 10.70 |
|   |    | LFi  | %    | 73.93 | 93.93 | 100.9 ↓ |      |      |      |       |       |      |       |
|   | Cr | LHFi | %    |       |       | 100.0 |      |      |      |       |       |      |       |
|   |    | Ti'  | °C.  |       |       | 5.70  |      |      |      |       |       |      |       |
| 3 | St | Ti   | °C.  | 7.00  | 6.00  | 5.70  | 6.09 | 1.500| 5.00 | 11.09 | 71.67 | 5.73 | 10.72 |
|   |    | LFi  | %    | 74.33 | 94.33 | 100.4 ↓ |      |      |      |       |       |      |       |
|   | Cr | LHFi | %    |       |       | 100.0 |      |      |      |       |       |      |       |
|   |    | Ti'  | °C.  |       |       | 5.72  |      |      |      |       |       |      |       |
| 4 | St | Ti   | °C.  | 7.00  | 6.00  | 5.72  | 6.10 | 1.500| 5.00 | 11.10 | 71.67 | 5.73 | 10.73 |
|   |    | LFi  | %    | 74.51 | 94.51 | 100.2 ↓ |      |      |      |       |       |      |       |
|   | Cr | LHFi | %    |       |       | 100.0 |      |      |      |       |       |      |       |
|   |    | Ti'  | °C.  |       |       | 5.73  |      |      |      |       |       |      |       |
| 5 | St | Ti   | °C.  | 7.00  | 6.00  | 5.73  | 6.10 | 1.500| 5.00 | 11.10 | 71.67 | 5.73 | 10.73 |
|   |    | LFi  | %    | 74.64 | 94.64 | 100.0 ↓ |      |      |      |       |       |      |       |
|   | Cr |      |      |       |       |       |      |      |      |       |       |      |       |

Last of all, a description is given of the possibility of another embodiment according to the present invention.

In the above embodiment, convergence calculations are made so that a minimum purchase amount of electric power is 0 kW (in the state where the back-flow of electric power is 0). It is, however, possible to appropriately set a minimum purchase amount of electric power in a heat and power supply facility including a lower-temperature chilled water group device, a chilled water group device, a hot water group device, a hot water supply group device, a steam generator, and an electric power generation group device. For example, when the electric power to be purchased is set to 100 kW in the field of minimum purchase amount of electric power, which is a specifying section for controlling a minimum purchase amount of electric power, the specifying section being provided in the operating condition setting section 40 with respect to electric power and a boiler, the number and the load factor of the electric power generation group devices to be operated on a time-slot basis are set by making convergence calculations, using the number and the load factor of the electric power generation group devices to be operated as parameters, so that electric power purchased from an electric power company is a minimum purchase amount of electric power. These convergence calculations are different from the convergence calculations made in the above embodiment only in the amount of generated electric power, depending on whether the electric power to be purchased, which is to be converged on, is 0 kW or 100 kW. In the example of the above simulation calculations, the total amount of generated electric power is 827.35 kW, and a minimum purchase amount of electric power is 0 kW. Thus convergence calculations are made, using the value of 827.35 kW as the determination value at the subsequent point, so that the electric power to be purchased is 0 kW, starting from the amount of generated electric power of 1000 kW at a load of 100%, to thereby balance the load factor of the low-pressure steam boiler and the heating value of the gas turbine. When a minimum purchase amount of electric power is 100 kW, convergence calculations are made, using 827.35−100=727.35 kW as the determination value at the subsequent point, so as to achieve a balance so that the electric power to be purchased is 100 kW.

Even if convergence calculations are made in the state where the purchase amount of electric power for a peak period is set, the convergence calculations are not different at all. The purchase amount of electric power in a peak period time slot to be obtained by achieving a balance in each time slot is calculated, and is merely multiplied by the electric power unit price, so as to calculate costs.

Industrial Applicability

The present invention is applicable to a system, for simulating a heat and power supply facility, that simulates the amount used of energy required for production of any item included in a total combined energy, in the heat and power supply facility that has a plurality of heat and power supply devices connected to each other, that is supplied with at least electric power and fossil fuel, and that produces electric power, lower-temperature chilled water, chilled water, hot water, hot water for supply, high-pressure steam, and low-pressure steam to supply a utilization facility with the produced items. Further, the present invention is applicable to a system that simulates an environmental load (a primary energy, $CO_2$, NOx, SOx) by multiplying a unit environmental load, set by an environmental load data setting section, by: each of the consumption of electric power, and the consumptions of fossil fuel and other fuel that have been obtained based on the conditions set by an energy load setting section, a basic condition setting section, a system configuration setting section, and an operating condition setting section. Furthermore, the present invention is applicable to an operating diagnosis by simulating an actual situation of a heat and power supply device, energy conservation by changing operating modes, improvement by renewing a device and energy conservation therefor, and assessment and consultation of the reduction of an environmental load.

Reference Signs List

1: simulation system, 2: user terminal, 3: administrator terminal, 4: DB server, 5: network, 6: user interface, 6a: monitor, 6b: keyboard, 6c: mouse, 7: CPU (calculation method), 7a: bus, 7b: temporary storage memory, 7c: HDD, 7d: network adaptor, 7p: calculation section, 7q: calculation determination section, 7x: data file, 7y: processing application (calculation method), 7z: load creation application, 10: energy load setting section, 20: basic condition setting section, 21: utility cost setting section, 21a: electric power cost setting section, 21b: fuel cost setting section, 22: process condition setting section, 23: environmental load data setting section, 24: temperature data setting section, 30: system configuration setting section, 40: operating condition setting section, 50: operating result output section, 60: case file etc. creation section, 70: display control section, 71: display window, 100: database group, 100a: read data, 110: individual data group, 200: customer database, 201: case file database, F: utilization facility, M: heat and power supply facility

The invention claimed is:

1. A system for simulating a heat and power supply facility that has a plurality of heat and power supply devices connected to each other, that is supplied with at least electric power and fuel (hereinafter referred to as a "supplied energy"), that produces at least two items (hereinafter referred to as a "total combined energy") selected from at least electric power, lower-temperature chilled water, chilled water, hot water, hot water for supply, high-pressure steam, and low-pressure steam, and that supplies a utilization facility with the total combined energy, and for obtaining relationships between operating conditions of the heat and power supply devices and an amount used of the supplied energy and/or an amount produced of the total combined energy, the system comprising:
an energy load setting section that sets an amount of the total combined energy that is required per day in the utilization facility per time slot;
a system configuration setting section that associates in advance the heat and power supply devices with each other and associates in advance the heat and power supply devices with the total combined energy, and selects any of the heat and power supply devices with an operation of an operating condition section, to thereby freely construct a system configuration of the heat and power supply facility in which the heat and power supply devices are associated with each other and the heat and power supply devices are associated with the total combined energy, the heat and power supply devices including at least one heat and power supply device having at least a motor pump;
a process condition setting section that sets process conditions of the heat and power supply facility and the utilization facility, the process conditions including at least one of an outdoor air temperature and a wet-bulb temperature;
an operating condition setting section that sets whether or not each of the heat and power supply devices is to be operated per time slot, and that sets an operating priority of each of the heat and power supply devices per time slot; and
a calculation section that at least calculates an amount produced of the total combined energy to be obtained when the heat and power supply facility is operated in accordance with the operating conditions set by the operating condition setting section, wherein any of the heat and power supply devices have a partial load characteristic, that varies in accordance with the process conditions; and
the calculation section makes convergence calculations so as to change a load factor of the heat and power supply devices corresponding to any item included in the total combined energy so that an amount produced of the item converges on a target value set by the energy load setting section, adjust, based on the changed load factor, a balance of the combined total energy associated with at least the corresponding heat and power supply devices, and repeatedly change the load factor of the corresponding heat and power supply devices and adjust the balance until the amount produced converges on the target value, wherein the energy load setting section, the system configuration setting section, the process condition setting second, the operating condition setting section, and the calculation section are implemented by a computer.

2. The system according to claim 1, wherein
the total combined energy is calculated such that a steam energy is calculated before an electric power energy is, and another energy is calculated before the steam energy is.

3. The system according to claim 1, wherein
the convergence calculations are convergent calculations made based on a numerical solution of algebraic equations.

4. The system according to claim 1, wherein
the heat and power supply devices are each classified by group including at least an electric power generation group, a boiler group, a chilled water group, a hot water group, a lower-temperature chilled water group, and a hot water supply group, so as to share a load determined based on a balance between the groups when any of the heat and power supply devices is selected.

5. The system according to claim 1, wherein
the system configuration setting section is capable of arbitrarily setting, among the heat and power supply devices, a plurality of heat and power supply devices that are of the same type, that differ in capacity, that differ in energy source for operation, or that differ in manufacturer, so as to cause each of the heat and power supply devices to operate in accordance with the operating conditions set by the operating condition setting section.

6. The system according to claim 1, wherein
the heat and power supply facility includes an electric power generation group device having an exhaust heat recovery boiler; and
when the electric power generation group device is operated under a preferential operation of heat load, an electric power generation load factor of the electric power generation group device per time slot is set by making convergence calculations so that an amount of steam generated by the exhaust heat recovery boiler of the electric power generation group device does not exceed a steam load required in the heat and power supply facility and/or the utilization facility.

7. The system according to claim 1, wherein
the heat and power supply facility includes an electric power generation group device having an exhaust heat recovery boiler; and
when the electric power generation group device is operated under a preferential operation of electric power load, an electric power generation load factor of the electric power generation group device per time slot is set by making convergence calculations so that an electrical energy from an electric power generator of the electric power generation group device does not flow back as surplus electricity to an electric power company.

8. The system according to claim 1, wherein
the heat and power supply facility includes a steam generator having a gas engine, a waste-hot-water-driven absorption chiller, and a chilled water group device;
an amount of heat of chilled water to be produced by the waste-hot-water-driven absorption chiller is calculated based on the number and a load factor of the waste-hot-water-driven absorption chiller to be operated that are set based on the operating conditions;
an amount of heat of chilled water of the waste-hot-water-driven absorption chiller that can be generated by an amount of heat of waste hot water recovered from the gas engine is calculated; and
the number and/or a load factor of all the chilled water group device to be operated per time slot are set by, when the amount of heat of chilled water to be generated is insufficient as compared to the amount of heat of chilled water to be produced, changing the number and/or a load factor of the chilled water group device to be operated in accordance with the operating conditions so that the chilled water group device compensate for the insufficient amount of heat of chilled water, and making convergence calculations by changing a load factor of the steam generator so that an amount of steam of the steam generator to be generated converges on an amount of steam of the chilled water group device that is required based on the changed number and/or the changed load factor of the chilled water group device to be operated.

9. The system according to claim 1, wherein
the heat and power supply facility includes a steam generator having a gas engine, a hot water recovery heat exchanger, and a hot water group device;
an amount of heat of hot water to be produced by the hot water recovery heat exchanger is calculated based on the number and a load factor of the hot water recovery heat exchanger to be operated that are set based on the operating conditions;
an amount of heat of hot water of the hot water recovery heat exchanger that can be generated by an amount of heat of waste hot water recovered from the gas engine is calculated; and
the number and/or a load factor of the hot water group device to be operated per time slot are set by, when the amount of heat of hot water to be generated is insufficient as compared to the amount of heat of hot water to be produced, changing the number and/or a load factor of the hot water group device to be operated in accordance with the operating conditions so that the hot water group device compensate for the insufficient amount of heat of hot water, and making convergence calculations by changing a load factor of the steam generator so that an amount of steam of the steam generator to be generated converges on an amount of steam of the hot water group device that is required based on the changed number and/or the changed load factor of the hot water group device to be operated.

10. The system according to claim 1, further comprising:
a lower-temperature chilled water group device, a chilled water group device, a hot water group device, a hot water supply group device, a steam generator, and an electric power generation group device, wherein
the operating condition setting section with respect to electric power and a boiler includes a specifying section for controlling a minimum purchase amount of electric power; and
the number and/or a load factor of the electric power generation group device to be operated per time slot are set by making convergence calculations so that electric power purchased from an electric power company is a minimum purchase amount of electric power specified by the specifying section.

11. The system according to claim 1, wherein
the heat and power supply devices include a plurality of heat source devices corresponding to any load of the total combined energy;
a load factor of each of the heat source devices is calculated again by calculating an overall heat balance by changing an outlet temperature of a device, among the heat source devices, whose load factor exceeds 100%; and
the outlet temperature is repeatedly changed until the load factors of all the heat source devices are equal to or less than 100%.

12. The system according to claim 11, wherein
the outlet temperature of the device, among the heat source devices, whose load factor exceeds 100% is set to a temperature where the load factor is 100%.

13. The system according to claim 1, wherein
conditions and parameters that are set in the respective setting sections can be stored as a case file in an electronic storage medium.

14. The system according to claim 1, wherein
the supplied energy further includes at least any of lower-temperature chilled water, chilled water, hot water, hot water for supply, high-pressure steam, and low-pressure steam.

15. The system according to claim 1, further comprising:
an air cooled heat pump that generates warm heat by collecting heat from the air; and/or
an electric heat pump system that generates warm heat by collecting heat from external use water, wherein
the heat and power supply facility exhausts heat to external use water.

16. The system according to claim 1, further comprising:
a display control section that displays and controls the heat and power supply facility as a flow diagram in which the plurality of heat and power supply devices, the supplied energy, and the total combined energy are connected to each other by connecting lines so as to be associated with each other in advance, wherein
when any of the heat and power supply devices are selected in the flow diagram and the system configuration of the heat and power supply facility based on the associations with the selected heat and power supply devices is constructed, the selected heat and power supply devices, the connecting lines, and the total combined energy and the supplied energy that are associated with the selected heat and power supply devices are distinguishably displayed.

17. The system according to claim 16, wherein
device data of the selected heat and power supply devices can be set using a device template file read from a DB server or a device template file modified by a user.

18. The system according to claim 16, wherein
when a setting of device data of a heat and power supply device, among the distinguishably displayed heat and power supply devices, has completed, display is made to further distinguishably indicate that change of the setting is completed.

19. The system according to claim 1, further comprising:
a calculation determination section that determines whether or not the convergence calculations made by the calculation section are completed, wherein
the heat and power supply devices include heat source devices; and
when the calculation determination section has determined that the convergence calculations are not completed because capacities of devices selected by the operating condition setting section are insufficient, the calculation determination section increases the number of heat source devices, among the heat source devices, that have lowest operating priorities set by the operating condition setting section, so that the calculations are completed, and the calculation section makes convergence calculations again based on the changed number of the heat source devices.

20. The system according to claim 19, wherein
when having increased the number of the heat source devices, the calculation determination section displays the operating conditions of the added heat source devices at least with types of classification of the added heat source devices.

21. The system according to claim 1, further comprising:
a setting section capable of making an energy assessment of an electric power load set by the energy load setting section in the heat and power supply facility, by switching for selection between whether the electric power load is used only in the utilization facility or is used in both the utilization facility and the heat and power supply facility.

22. The system according to claim 1, further comprising:
a setting section capable of making an energy assessment of a steam load set by the energy load setting section in the heat and power supply facility, by switching for selection between whether the steam load is used only in the utilization facility or is used in both the utilization facility and the heat and power supply facility.

23. The system according to claim 1, wherein
when the heat and power supply devices are specified with a time on the operating conditions and displayed and any of the heat and power supply devices, the supplied energy, and the total combined energy are selected, a calculation result of the calculation section at the specified time on the operating conditions is displayed.

* * * * *